US010392919B2

(12) United States Patent
Peyaud et al.

(10) Patent No.: US 10,392,919 B2
(45) Date of Patent: Aug. 27, 2019

(54) SIMULATED CORE SAMPLE ESTIMATED FROM COMPOSITE BOREHOLE MEASUREMENT

(71) Applicant: BAKER HUGHES INCORPORATED, Houston, TX (US)

(72) Inventors: Jean-Baptiste Peyaud, Bayswater (AU); Qiong Zhang, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 558 days.

(21) Appl. No.: 15/078,158

(22) Filed: Mar. 23, 2016

(65) Prior Publication Data

US 2017/0275982 A1    Sep. 28, 2017

(51) Int. Cl.
*E21B 47/00* (2012.01)
*H04N 7/18* (2006.01)
(Continued)

(52) U.S. Cl.
CPC .......... *E21B 47/0002* (2013.01); *G01V 11/00* (2013.01); *H04N 7/18* (2013.01);
(Continued)

(58) Field of Classification Search
CPC ...... E21B 47/0002; G01V 11/00; G01V 1/50; G01V 2210/6224; G01V 2210/6244; G01V 2210/665; H04N 7/18
(Continued)

(56) References Cited

U.S. PATENT DOCUMENTS 4,567,759 A * 2/1986 Ekstrom ................. E21B 47/00
324/355
6,044,327 A 3/2000 Goldman
(Continued)

FOREIGN PATENT DOCUMENTS

WO    2014-202618 A2    12/2014

OTHER PUBLICATIONS

Mount Sopris Instruments, "QL40-OBI-2G Optical Televiewer" (retrieved http://mountsopris.com/items/ql40-obi-2g-optical-televiewer (Dec. 9, 2015).
(Continued)

*Primary Examiner* — Deirdre L Beasley
(74) *Attorney, Agent, or Firm* — Mossman, Kumar & Tyler, PC

(57) ABSTRACT

Methods, systems, and devices for evaluating an earth formation intersected by a borehole using information from standard resolution measurements. Methods include generating an image representative of the formation over an interval of borehole depth, the image having a second resolution greater than the first resolution. Generating the image may be carried out by identifying layers corresponding to lithotype facies within the interval, the layers defined by boundaries having boundary locations along the borehole; and using a unified characterization of the formation within the interval determined from the standard resolution measurements and the boundary locations within the interval to solve for a value for the formation parameter corresponding to each layer consistent with the unified characterization of the interval. The unified characterization may be an average value for the formation parameter within the interval.

20 Claims, 12 Drawing Sheets

(51) Int. Cl.
*G01V 11/00* (2006.01)
*G01V 1/50* (2006.01)

(52) U.S. Cl.
CPC ........ *G01V 1/50* (2013.01); *G01V 2210/6224* (2013.01); *G01V 2210/6244* (2013.01); *G01V 2210/665* (2013.01)

(58) Field of Classification Search
USPC .......................................................... 348/85
See application file for complete search history.

(56) References Cited

U.S. PATENT DOCUMENTS

| | | | |
|---|---|---|---|
| 6,337,568 B1 | 8/2002 | Tutunji et al. | |
| 7,073,378 B2 | 7/2006 | Smits et al. | |
| 7,342,222 B2* | 3/2008 | Griffiths | G01V 5/045 |
| | | | 250/262 |
| 7,511,813 B2* | 3/2009 | Vannuffelen | G01J 3/18 |
| | | | 250/269.1 |
| 7,880,134 B2* | 2/2011 | Kirkwood | G01V 5/101 |
| | | | 250/269.6 |
| 8,101,907 B2* | 1/2012 | Jacobi | G01V 5/12 |
| | | | 250/256 |
| 8,573,298 B2* | 11/2013 | Jacobi | G01V 11/00 |
| | | | 166/254.2 |
| 9,207,356 B2 | 12/2015 | Chen et al. | |
| 2008/0130407 A1* | 6/2008 | Akhtar | G01V 1/42 |
| | | | 367/9 |
| 2011/0218735 A1* | 9/2011 | Han | G01V 5/125 |
| | | | 702/8 |
| 2011/0242936 A1* | 10/2011 | Pabon | G01V 1/50 |
| | | | 367/35 |
| 2012/0084009 A1* | 4/2012 | Peyaud | G01V 5/06 |
| | | | 702/7 |
| 2012/0272724 A1* | 11/2012 | Hollmann | G01V 3/38 |
| | | | 73/152.15 |
| 2014/0241111 A1* | 8/2014 | Mickael | G01V 1/284 |
| | | | 367/7 |
| 2015/0007984 A1* | 1/2015 | Donderici | E21B 47/09 |
| | | | 166/250.01 |
| 2015/0241591 A1* | 8/2015 | Burmester | G01V 3/20 |
| | | | 702/7 |
| 2016/0155021 A1* | 6/2016 | Yamada | G01V 1/306 |
| | | | 382/109 |
| 2016/0170063 A1* | 6/2016 | Leggett | G01V 1/44 |
| | | | 367/7 |
| 2016/0282512 A1* | 9/2016 | Donderici | E21B 43/26 |
| 2017/0090059 A1* | 3/2017 | San Martin | G01V 3/24 |
| 2017/0168192 A1* | 6/2017 | Vasilyev | G01V 5/102 |
| 2017/0176627 A1* | 6/2017 | Venkataramanan | G01V 3/32 |
| 2017/0176628 A1* | 6/2017 | Paulsen | G01V 3/32 |
| 2017/0205531 A1* | 7/2017 | Berard | G01V 11/00 |
| 2017/0211381 A1* | 7/2017 | Chemali | E21B 47/0002 |
| 2017/0248016 A1* | 8/2017 | Hu | G01N 23/2252 |
| 2017/0306744 A1* | 10/2017 | Chen | E21B 17/1078 |
| 2018/0003029 A1* | 1/2018 | Roberson | E21B 33/14 |
| 2018/0031732 A1* | 2/2018 | Mosse | G01V 1/50 |
| 2018/0045031 A1* | 2/2018 | Shaposhnikov | E21B 33/14 |
| 2018/0100945 A1* | 4/2018 | Ewe | G01V 3/38 |

OTHER PUBLICATIONS

PCT Application No. PCT/US2017/022664—International Preliminary Report on Pantability dated Sep. 15, 2018.

* cited by examiner

SIMULATED CORE SAMPLE ESTIMATED FROM COMPOSITE BOREHOLE MEASUREMENT

FIELD OF THE DISCLOSURE

This disclosure generally relates to borehole logging methods and apparatuses for estimating formation properties using nuclear radiation based measurements.

BACKGROUND OF THE DISCLOSURE

Oil well logging has been known for many years and provides an oil and gas well driller with information about the particular earth formation being drilled. In conventional oil well logging, during well drilling and/or after a well has been drilled, a nuclear radiation source and associated nuclear radiation detectors may be conveyed into the borehole and used to determine one or more parameters of interest of the formation. A rigid or non-rigid conveyance device is often used to convey the nuclear radiation source, often as part of a tool or a set of tools, and the carrier may also provide communication channels for sending information up to the surface.

Exploration and production of hydrocarbons require accurate and detailed knowledge of earth formations that may contain reservoirs of the hydrocarbons. For example, it is important to know the lithology of the earth formations as a function of depth, particularly thinly bedded formations.

SUMMARY OF THE DISCLOSURE

In aspects, this disclosure relates to evaluation of an earth formation using radiation from the formation. In aspects, this disclosure relates to evaluation of a volume of interest of an earth formation using radiation from the formation measured in the borehole along with electromagnetic measurements in the borehole. The radiation may be induced by neutron irradiation. In some aspects, this disclosure relates to estimating a parameter of interest related to the formation.

Aspects of the disclosure relate to evaluating an earth formation intersected by a borehole using standard resolution measurements, where the standard resolution measurements have a first resolution resulting from a downhole instrument used to obtain the measurements. Evaluation may include improving the resolution of the measurements. In some aspects, this disclosure relates to estimating a parameter of interest related to the volume using information from the standard resolution tool at a higher resolution. The parameter of interest may include a lithology parameter or mineralogy parameter.

Method embodiments include evaluating an earth formation intersected by a borehole using standard resolution measurements, the standard resolution measurements having a first resolution resulting from a downhole instrument used to obtain the measurements. Methods may include generating an image representative of the formation over an interval of borehole depth, the image having a second resolution greater than the first resolution. Generating the image may be carried out by identifying layers corresponding to lithotype facies within the interval, the layers defined by boundaries having boundary locations along the borehole; and using a unified characterization of the formation within the interval determined from the standard resolution measurements and the boundary locations within the interval to solve for a value for the formation parameter corresponding to each layer consistent with the unified characterization of the interval. The unified characterization may be an average value for the formation parameter within the interval. The second downhole instrument may be at least one of: i) an acoustic imager; ii) a resistivity imager; iii) an RF imager; and iv) a nuclear imager.

Solving for the value for the formation parameter corresponding to each layer may include generating a plurality of solutions, each solution including values for the formation parameter corresponding to each layer; and determining an optimal solution from the plurality of solutions providing a maximum combined likelihood for the values for the formation parameter. The unified characterization may include a fraction of each of a plurality of mineral constituent solids forming a rock matrix within the interval, wherein each mineral constituent solid of the plurality of mineral constituent solids has a defined chemical composition. The unified characterization may include a composition of the interval comprising at least one of: i) a bulk elemental composition; and ii) a bulk mineralogical composition. The formation parameter may be a lithological parameter. The formation parameter may be a gross lithology selected from a set of gross lithologies. The set of gross lithologies may consist of: i) sandstone; ii) shale; iii) limestone; iv) dolomite; v) evaporitic sedimentary rocks, vi) salts and vii) igneous and metamorphic rocks. Methods may include identifying those of the gross lithologies present in the interval.

Methods may include estimating dimensions of each layer. Identifying the layers may be carried out by obtaining a borehole image with a second downhole instrument having a resolution greater than the first resolution. Solving for the value for the formation parameter corresponding to each layer may include estimating the most likely volume fraction for each mineral in each layer. Estimating the most likely volume fraction may be carried out by: generating at least one proposed lithology for each layer; representing a probability for particular volume fractions in a range of volume fractions for each mineral in each layer using a corresponding probability distribution function; generating a solution that has a maximum aggregate probability by using the corresponding probability distribution functions to estimate the most likely volume fraction for each mineral in each layer.

Generating the solution may include, for each mineral volume fraction: identifying equality constraints and inequality constraints from the lithotype facies; defining a solution space for the respective mineral volume fraction based on inequality constraints; determining for the respective mineral volume fraction a solution surface based on equality constraints; determining the solution surface within the solution space representing both equality constraints and inequality constraints on possible values; and performing sampling on the solution surface to determine the solution having the maximum probability for the respective mineral volume fraction. Performing sampling may include sampling at uniform intervals from the initial solution on the solution surface. Performing sampling may include initially determining a starting point on the solution surface satisfying the inequality constraints, the starting point initiated as the initial solution; determining a random direction on the surface; and estimating the point with the maximum probability for the respective mineral volume fraction by taking samples along the randomly selected direction at intervals from the starting point; calculating a probability for each sampled point; and using the point associated with a new maximum as a new starting point. Performing sampling may include computing maximum step sizes consistent with inequality constraints; estimating the point with the maximum probability for the respective mineral volume fraction by taking samples along the randomly selected direction at varying intervals from the starting point within the maximum step sizes.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
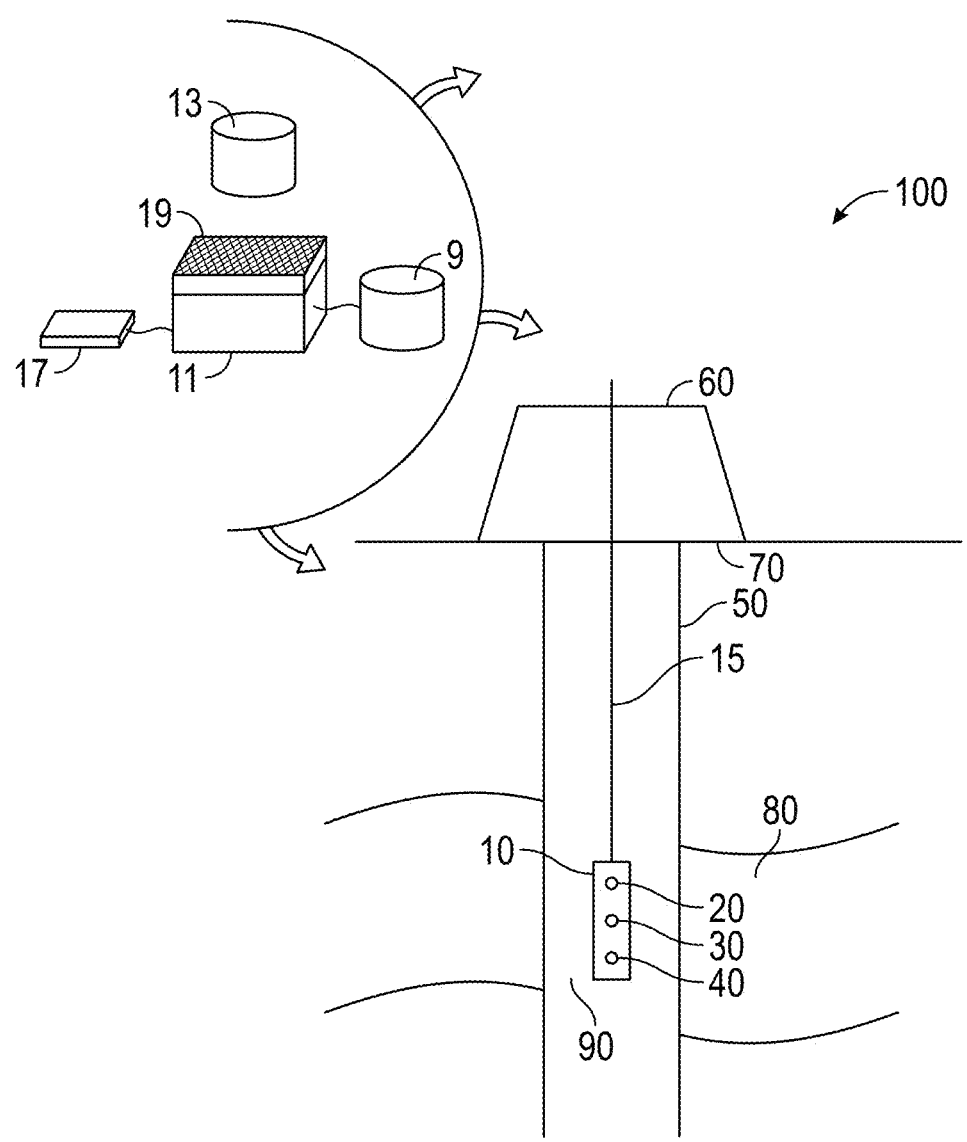
FIG. 1A schematically illustrates a system having a downhole tool configured to acquire radiation-based information in a borehole intersecting a volume of interest of an earth formation in accordance with embodiments of the present disclosure.

Aspects of the disclosure relate to evaluating an earth formation intersected by a borehole using standard resolution measurements, where the standard resolution measurements have a first resolution resulting from a downhole instrument used to obtain the measurements. Evaluation may include improving the resolution of the measurements.

In aspects, this disclosure relates to evaluation of a volume of interest of an earth formation using radiation from the formation measured in the borehole along with electromagnetic measurements in the borehole. In some aspects, this disclosure relates to estimating a parameter of interest related to the volume at the higher resolution. The parameter of interest may include a lithology parameter or mineralogy parameter.

In some general embodiments, after processing to improve the image, a direct quantification of mineralogy at the scale of the lamination in thinly bedded formations may be generated.

Illustrative methods for estimating parameters of interest may include the acquiring and utilization of information characterizing radiation from the formation responsive to irradiation by the apparatus. The information may be acquired by tools deployed into a wellbore intersecting one or more volumes of interest of an earth formation. The radiation (e.g., thermal, epithermal, or other neutrons, gamma rays, etc.) may be detected at one or more detectors on these tools in the borehole. In some aspects, this disclosure relates to logging in real time in a measurement-while-drilling (MWD) tool. For context, an exemplary system for deploying and using such tools to acquire this information is described below. The acquired radiation measurement information may be then be processed to estimate parameters of interest of the formation, which are then used to better conduct further exploration, development, and production operations in the formation. Each of these aspects may be referred to generally as investigation of the formation.

General method embodiments may include irradiating the earth formation using a radiation source to generate radiation from the formation responsive to the irradiation; taking a radiation measurement and thereby generating radiation measurement information by producing light scintillations from a scintillation material responsive to the absorption by the scintillation material of the radiation from the formation and substantial intrinsic radiation of the scintillation material; and estimating a parameter of interest of the earth formation using the radiation measurement information.

A lithology characterizing a formation may be determined using one or more of several techniques. A common technique is to retrieve core samples from an earth formation and perform intensive analysis of the core sample at the surface. Typically this is conducted off-site at a specialized facility remote from the well site. While core samples can provide the detailed knowledge petro-analysts and geophysicists desire, obtaining the samples from deep within the earth formation and performing the analysis can be quite time intensive.

A neutron logging tool may be used to obtain lithology parameters by measuring radiation resulting from neutron irradiation of the earth formation. The measured radiation is indicative of the reaction of the neutrons with constituents of the formation and thus contains information about the earth formation. As one example, interactions between the neutrons and the formation may result in the emission of gamma rays with energy levels characteristic of the materials with which the neutrons have interacted. Measurements are repeated at a plurality of borehole depths along the longitudinal axis of the borehole. Each measurement is associated with a borehole depth at which it is taken. Unfortunately, however, neutron logging generally provides a coarse vertical resolution (resolution in the direction parallel with the longitudinal axis) between approximately one and two feet. This resolution is insufficient to locate boundaries of thin beds (e.g., beds less than one foot in thickness). Thus, at the current level of technology, a direct measurement is not possible as these object are commonly far below the vertical resolution of logging tools.

In a first general embodiment, the present disclosure enables an increase in vertical resolution of the radiation-based logging tools to provide mineralogy parameter values at a level of resolution corresponding to an image log. In embodiments, this tool includes a pulsed neutron generator and a single scintillation detector with a neutron shield disposed between neutron generator and the detector. The inelastic and capture spectra detected by the detector are distributed into 256 channels to obtain elemental yields that are then converted into dry elemental weight fractions. By combining the mineralogical and sedimentological information, techniques of the present disclosure provide a high resolution tool for the evaluation of petroleum potential in thinly bedded formations. More specific embodiments may provide mineralogy logs, matrix density logs, and total porosity logs with a high vertical resolution, as well as allowing calculation of net-to-gross and net pay in thin bed formations.

More general embodiments may include generating an image representative of the formation over an interval of borehole depth using standard resolution measurements having a first resolution resulting from a downhole instrument used to obtain the measurements, where the image has a second resolution greater than the first resolution, using techniques described herein to improve resolution. Methods include generating an image representative of the formation over an interval of borehole depth at the second resolution by: identifying layers corresponding to lithotype facies within the interval, where the layers defined by boundaries having boundary locations along the borehole; and using i) a unified characterization of the formation within the interval determined from the standard resolution measurements and ii) the boundary locations within the interval to solve for a value for the formation parameter corresponding to each layer consistent with the unified characterization of the interval.

As used herein, the term "lithotype" means a geological unit characterized by an ensemble of parameters, such as, for example, specific lithology, mineralogical composition, porosity, permeability, grainsize distribution, sedimentological texture, and sedimentological structures. As used herein, the term "facies" means specific characteristic or ensemble of characteristics that individualise a body of rock and allow discriminating it from its surroundings either by way of measurement, observation, or both. As used herein, the term "unified characterization" means a bulk description of the interval in the aggregate. Example lithotype facies include sandstone, calcite cemented sandstone, shale, limestone, and dolomite.

For example, natural gamma radiation logs and neutron-induced radiation logs may provide accurate identification of lithotype facies, but with a coarse vertical resolution of approximately two feet in some tools. A high-resolution borehole image log may provide accurate vertical resolution of resistivity and changes in resistivity as small as a few millimeters but with limited ability to identify lithotype facies or minerals.

As one example, aspects of the present disclosure generate a simulated core sample measurement estimated from a composite borehole measurement ('composite core' measurement). The composite core technique may combine parameter values estimated from measurements by neutron logging tools, such as, for example, the Formation Lithology eXplorer™ (FLeX™) elemental spectroscopy wireline logging tool manufactured by BAKER HUGHES INCORPORATED of Houston, Tex., or other mineralogical tools with sedimentological and structural features from image logs to generate a description of the borehole similar to a core description. Spectral information recorded by a radiation-based tool is an average of the mineralogy of each lithological component in the analyzed volume, weighted by the volume of each lithological component.

Embodiments of the composite core technique described herein may employ a high resolution image log to determine the volume of each lithological component so their combined composition is consistent with the unified characterization. Mineralogy can then be distributed based on the sedimentological features recorded in the image log. The high resolution image log may be obtained using a high resolution electromagnetic imager (e.g., resistivity imager), acoustic imager, optical imager, and so on.

For example, electrical earth borehole logging is well known and various devices and various techniques have been described for this purpose. Broadly speaking, there are two categories of devices used in electrical logging devices. In the first category, at least one transmitter such as a current electrode (e.g., a current source or sink) is used in conjunction with a diffuse return electrode (such as the tool body or mandrel of the logging tool). Conventionally, the electrode injecting current has been known as a "button." A measured electric current flows in a circuit that connects a current source to the transmitter, through the earth formation to the return electrode and back to the current source in the tool. In inductive measuring tools, a current flow is induced within the earth formation, such as, for example, by using an antenna within the measuring instrument. The magnitude of the induced current is detected using either the same antenna or a separate receiver antenna. The present disclosure may utilize either category.

Electrical logging devices may be operable in one or more modes. In one mode, a constant current is maintained at a measuring electrode while a voltage is measured; in another mode, the voltage of the measuring electrode is held constant and the current is measured. Ideally, if current is varied to maintain a constant voltage, the resultant current is inversely proportional to the resistivity of the earth formation being investigated. Conversely, if current is maintained constant through the circuit, ideally speaking the voltage of the measurement electrode is proportional to the resistivity of the earth formation being investigated. Ohm's law teaches that if both current and voltage vary, the resistivity of the earth formation is proportional to the ratio of the voltage to the current. These electrical measurements may be correlated with electrical properties of the borehole, such as resistivity parameters (e.g., a resistivity image of a volume of interest of the formation).

Herein, the terms "nuclear radiation" and "radiation emission" include particle and non-particle radiation emitted by atomic nuclei during nuclear processes (such as radioactive decay and/or nuclear bombardment), which may include, but are not limited to, photons from neutron inelastic scattering and from neutron thermal capture reactions, neutrons, electrons, alpha particles, beta particles, and pair production photons.

The formation may be exposed to energy from a radiation source. Downhole tools may include this radiation source and one or more detectors in one or more detector chambers. Herein, the radiation source may include, but is not limited to, a pulsed neutron source. The detectors may be used to detect radiation from the formation, though the detectors are not limited to detecting radiation of the same type as emitted by the radiation source. For example, following neutron irradiation of the earth formation, interactions between the neutrons and nuclides in the formation may produce gamma radiation (e.g., gamma rays) that may be detected by the radiation detectors. The response from the formation may be in the form of prompt and/or delayed nuclear radiation, such as gamma rays from the radioactive decay of the isotopes, and the amount of nuclear radiation may be a function of the amount of radioactive isotopes present.

As one example, application of neutrons may cause "activation" of specific nuclides (e.g., carbon, silicon, and oxygen) that may be found in a downhole environment. The activated nuclides may emit ionizing radiation, such as gamma rays. The term "activation" relates to the conversion of a normally stable nuclide into a radionuclide through a nuclear process, such as, but not limited to, neutron-proton (n,p) reactions and radiative capture (n,γ). Depending on the radionuclide, in some applications the delayed decay spectrum may have characteristics that allow the radionuclide to be used as a nuclear radiation source.

For example, oxygen-16 is irradiated by fast neutrons (over 10 MeV), the interaction of the neutrons with the oxygen-16 nuclide may result in a nitrogen-16 radionuclide which may emit specific gamma rays. In another mode, fast neutrons can inelastically scatter from oxygen-16 nuclei, putting the nuclei in an excited energy state. This may result in a gamma emission so that the nucleus can go back to stable energy state.

The same or different detectors may detect radiation from naturally occurring radionuclides. Detectors may include at least one radiation responsive component, such as a scintillation media or a semiconductor material; and at least one output device generating information in response to detections in the radiation responsive component. The output device may be implemented with a photomultiplier tube ('PMT').

The light yield of a crystal is proportional to deposited radiation energy. The PMT converts the light output of the crystal into an electrical charge (e.g., current) pulse following each scintillation event. In some implementations, a preamplifier circuit may be placed after the PMT to integrate the burst electric charge into a voltage signal, although other types of signals may be used. The magnitude of the voltage signal corresponds to the energy of gamma rays, and information from the output device may include an energy spectrum representative of the detected radiation. The energy spectrum may be expressed in terms of magnitude (e.g., gamma ray counts per period of time) as a function of energy.

The response spectrum may be measured over a wide range of energies, resulting in improved estimation of the parameter of interest. For example, the response spectrum may span a continuous energy range including gamma ray photo peaks at characteristic energies of interest. Alternatively, specific energy windows may be used which are best suited for particular techniques or for estimating particular parameters.

Response spectrum refers to not only the response spectrum as originally acquired, but also after filtering, corrections, or pre-processing is applied. Since the energy spectrum may include energy spectrum components from multiple sources, the nuclear radiation information may be separated to identify the components contained with the energy spectrum. In some embodiments, the processing may include, but is not limited to, use of one or more of: (i) a mathematical equation, (ii) an algorithm, (iii) an energy spectrum deconvolution technique, (iv) a stripping technique, (v) an energy spectrum window technique, (vi) a time spectrum deconvolution technique, and (vii) a time spectrum window technique.

The energy spectrum may be used to estimate parameters of interest of an earth formation. For example, the radioactive decay of radionuclides may produce nuclear radiation that may be detected by radiation detectors, as described above. Radionuclides may include naturally occurring radionuclides, such as potassium-40, and the uranium and thorium series, which exist in the earth formation and activated radionuclides, which may include radionuclides activated from the irradiation of nuclides with nuclear radiation. Since the energy spectrum may include energy spectrum components from multiple radionuclides, the nuclear radiation information may be separated to identify the energy spectrum components contained within the energy spectrum, and thereby estimate the concentration of at least one radionuclide in the volume of interest of the earth formation.

If multiple detectors are used, the detectors may be spaced in a substantially linear fashion relative to the radiation source. The detectors may be spaced at different distances from the radiation source. For example, if two detectors are used, there may be a short spaced (SS) detector and a long spaced (LS) detector. The SS and LS detectors are not limited to being placed on the same side of the radiation source as long as their spacing from the radiation source is different. Additional detectors may be used, for example, having differing spacing from the spacing of the other detectors relative to the radiation source. In some implementations, one of the two detectors may be a neutron detector, while the other detector may be a neutron detector or another type of radiation detector, such as, but not limited to, a gamma-ray detector and/or an x-ray detector.

The detectors may detect neutrons and gamma rays emitted by the volume of interest. The radiation information may include multiple components, made up of, for example neutrons, gamma rays, and the like. The components may be detected simultaneously. An algorithm may be used to deconvolve the radiation information into the constituent components.

The components may provide multiple depths of investigation. Since the components may be detected simultaneously using a single detector, the radiation information may be collected over a short period of time, such as a single pulse cycle. Herein, a pulse cycle is defined as the period between the initiation of a first neutron pulse by a neutron source and a second pulse, thus the pulse cycle includes the neutron pulse period and its associated decay period. In one embodiment, the pulse cycle is about 1000 microseconds (e.g., a 60 microsecond pulse period and 940 microsecond decay period).

In some embodiments, porosity and traditional SIGMA for a formation may be estimated. In other embodiments, gamma count may be used to estimate gamma-driven SIGMA measurements for the volume of interest.

FIG. 1A schematically illustrates a system 100 having a downhole tool 10 configured to acquire information in a borehole 50 intersecting a volume of interest of an earth formation 80 for estimating density, oil saturation, and/or other parameters of interest of the formation 80. The parameters of interest may include information relating to a geological parameter, a geophysical parameter, a petrophysical parameter, and/or a lithological parameter. Thus, the tool 10 may include a sensor array including sensors for detecting physical phenomena indicative of the parameter of interest may include sensors for estimating formation resistivity, dielectric constant, the presence or absence of hydrocarbons, acoustic density, bed boundary, formation density, nuclear density and certain rock characteristics, permeability, capillary pressure, and relative permeability. The tool 10 may include detectors 20, 30 for detecting radiation (e.g., radiation detectors) and a radiation source 40. Detectors 20, 30 may detect radiation from the borehole, the tool, or the formation. In some embodiments, the tool 10 may have more or fewer detectors (or sources).

The system 100 may include a conventional derrick 60 and a conveyance device (or carrier) 15, which may be rigid or non-rigid, and may be configured to convey the downhole tool 10 into wellbore 50 in proximity to formation 80. The carrier 15 may be a drill string, coiled tubing, a slickline, an e-line, a wireline, etc. Downhole tool 10 may be coupled or combined with additional tools. Thus, depending on the configuration, the tool 10 may be used during drilling and/or after the borehole (wellbore) 50 has been formed. While a land system is shown, the teachings of the present disclosure may also be utilized in offshore or subsea applications. The carrier 15 may include embedded conductors for power and/or data for providing signal and/or power communication between the surface and downhole equipment. The carrier 15 may include a bottom hole assembly, which may include a drilling motor for rotating a drill bit.

In some embodiments, the optional radiation source 40 emits radiation (e.g., neutrons) into the formation to be surveyed. In one embodiment, the downhole tool 10 may use a pulsed neutron generator emitting 14.2 MeV fast neutrons as its radiation source 40. The use of 14.2 MeV neutrons from a pulsed neutron source is illustrative and exemplary only, as different energy levels of neutrons may be used. In some embodiments, the radiation source 40 may be continuous. In some embodiments, the radiation source 40 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source.

Due to the intermittent nature of the radiation source, radiation from the source will reach differently spaced detectors at different times. When the radiation source transmits a signal, such as a pulse, the resulting response from the earth formation may arrive at the respective detectors at different times.

Additional detectors may be used to provide additional radiation information. Two or more of the detectors may be gamma ray detectors. Some embodiments may include radiation shielding (not shown). Drilling fluid 90 may be present between the formation 80 and the downhole tool 10, such that radiation may pass through drilling fluid 90 to reach the detectors 20, 30.

Certain embodiments of the present disclosure may be implemented with a hardware environment that includes an information processor 11, an information storage medium 13, an input device 17, processor memory 19, and may include peripheral information storage medium 9. The hardware environment may be in the well, at the rig, or at a remote location. Moreover, the several components of the hardware environment may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware. When the program is loaded from information storage medium 13 into processor memory 19 (e.g. computer RAM), the program, when executed, causes information processor 11 to retrieve detector information from either information storage medium 13 or peripheral information storage medium 9 and process the information to estimate a parameter of interest. Information processor 11 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods as described herein. These instructions may provide for equipment operation, control, data collection and analysis, and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In other embodiments, such electronics may be located elsewhere (e.g., at the surface, or remotely). To perform the treatments during a single trip, the tool may use a high bandwidth transmission to transmit the information acquired by detectors 20, 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the activity in "real time."

The short-spaced (SS) detector 30 is closer to the source 40 than the long-spaced (LS) detector 20. Fast neutrons (approximately 14.2 MeV) are emitted from the source 40 and enter the borehole and formation, where they undergo several types of interactions. During the first few microseconds (μs), before they lose much energy, some neutrons are involved in inelastic scattering with nuclei in the borehole and formation and produce gamma rays. These inelastic gamma rays have energies that are characteristic of the atomic nuclei that produced them. The atomic nuclei found in this environment include, for example, carbon, oxygen, silicon, calcium, and some others.

In various embodiments, two or more gamma-ray detectors may be employed in one or more modes of operation. Such modes include, but are not limited to, a pulsed neutron capture mode, a pulsed neutron spectrometry mode, a pulsed neutron imager mode, and a neutron activation mode. In a pulsed neutron capture mode, for example, the pulsed neutron generator may pulse at 1 kHz, and records a complete time spectrum for each detector.

An energy spectrum may also be recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

In a pulsed neutron spectrometry mode, at least one processor may cause the instrument to pulse at 10 kHz, for example, and record full inelastic and capture gamma ray energy spectra from each detector. The radiation information may be processed to determine elemental ratios including carbon/oxygen and calcium/silicon from the inelastic spectra and silicon/calcium from the capture spectra.

Figure 1B:
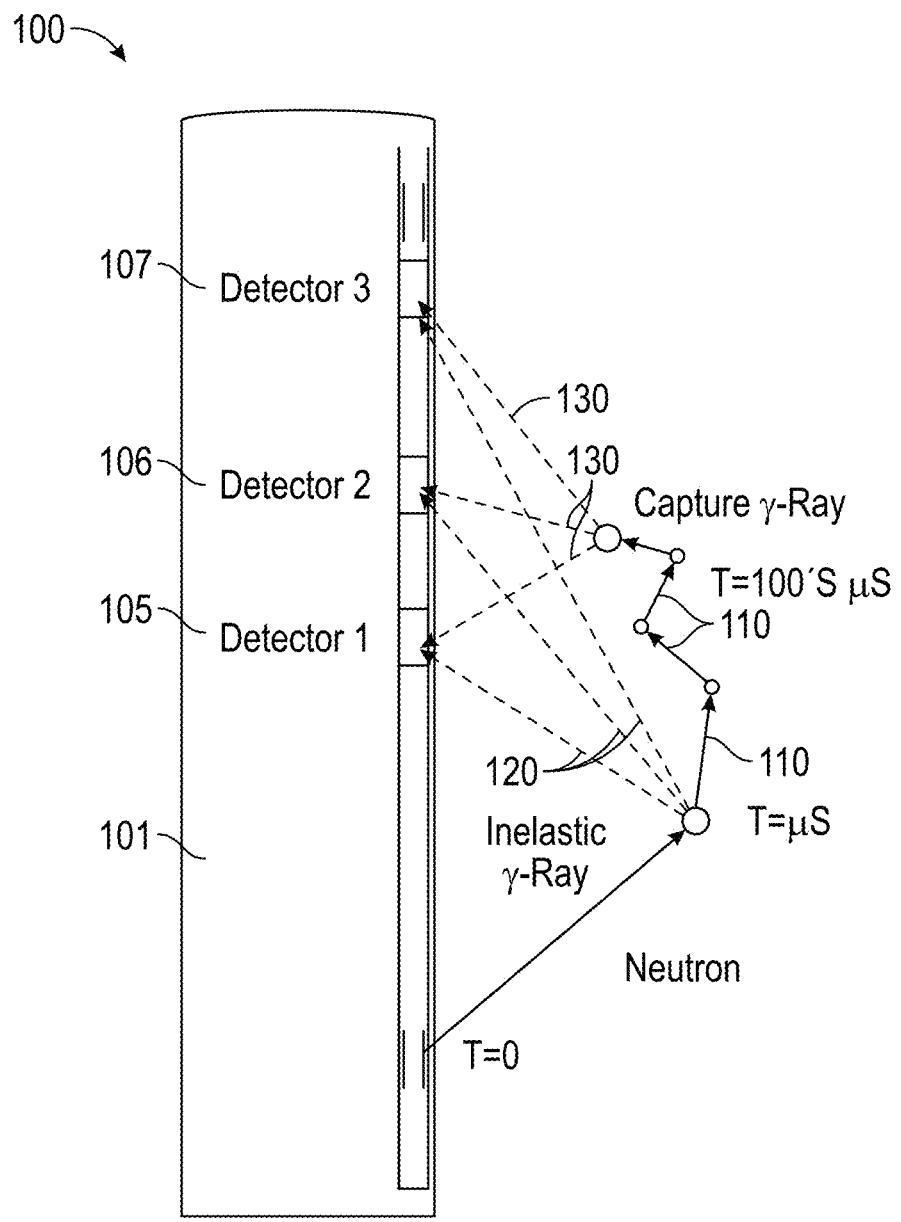
FIG. 1B illustrates interactions between radiation and the volume of interest of the earth formation in accordance with embodiments of the present disclosure.

After just a few microseconds, most of the neutrons are slowed by either inelastic or elastic scattering until they reach thermal energies, e.g., at about 0.025 eV. This process is illustrated schematically in FIG. 1B as the sequence of solid arrows 110. At thermal energies, neutrons continue to undergo elastic collisions, but they no longer lose energy on average. A few μs after the neutron generator shuts off, the process of thermalization is complete. Over the next several hundred μs, thermal neutrons are captured by nuclei of various elements—again producing gamma rays, known as capture gamma rays 130. A capture gamma ray energy spectrum yields information about the relative abundances of these elements. The inelastic gamma rays are depicted by 120. These components of radiation are detected by detectors 105-107 of tool 101.

U.S. Pat. No. 7,205,535 to Madigan et al., having the same assignee as the present disclosure and the contents of which are incorporated herein by reference, discloses obtaining an elemental analysis of an earth formation obtained using measurements from a pulsed neutron logging tool. See also, Pemper et al., The Direct Measurement of Carbon in Wells Containing Oil and Natural Gas Using a Pulsed Neutron Mineralogy Tool, SPE 124234, Society of Petroleum Engineers, 2009.

Figure 2:
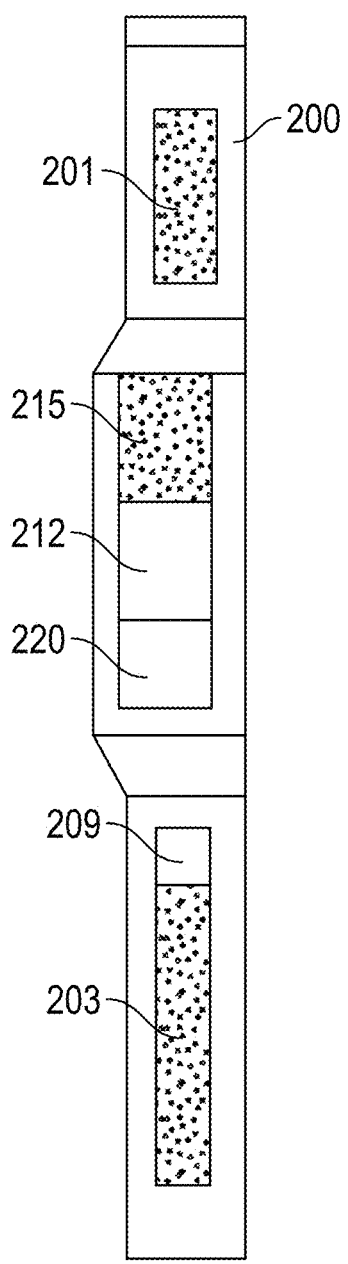
FIGS. 2 and 3 illustrate downhole tools in accordance with embodiments of the present disclosure.
Figure 3:
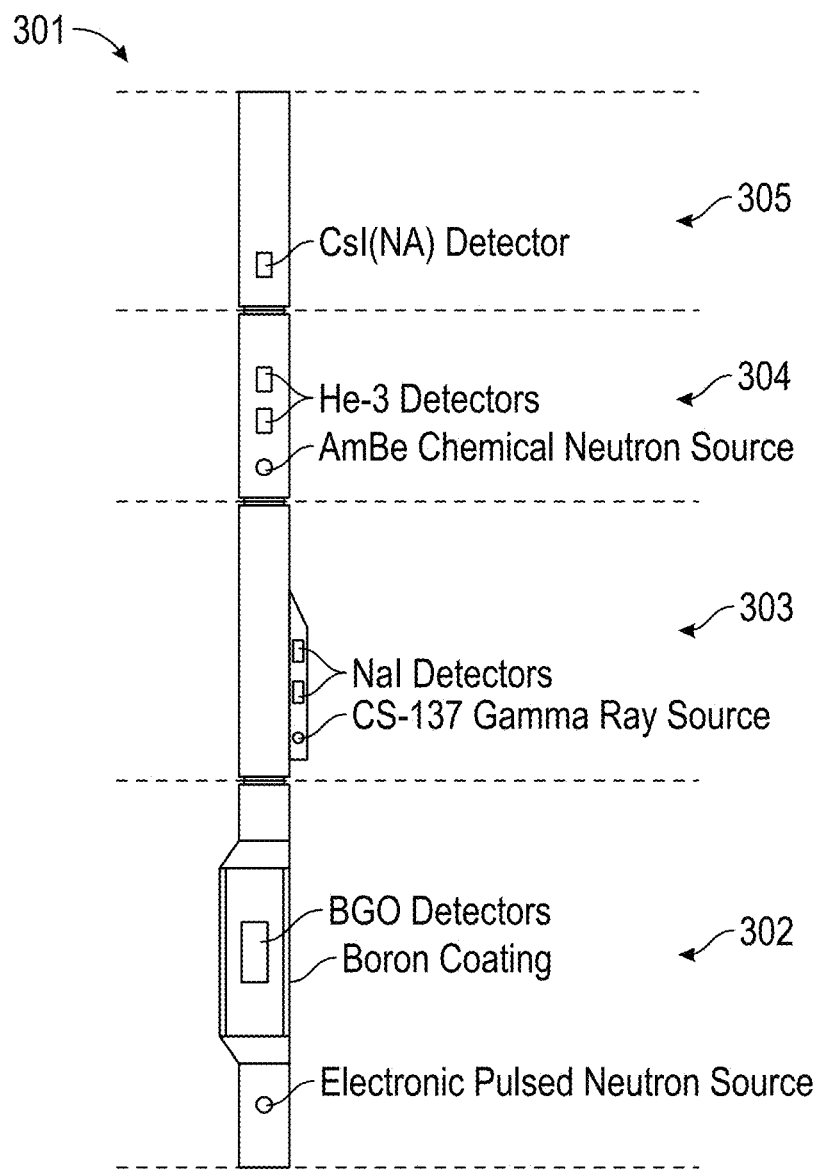

FIGS. 2 & 3 illustrate downhole tools in accordance with embodiments of the present disclosure. Under many conditions, measurements may be made in combination with Gamma Ray/Spectralog, Neutron, and Density nuclear tools, and/or NMR tools. Referring to FIG. 2, the measurement device employs the principle of neutron-induced gamma ray spectroscopy. The component parts may be encapsulated within device casing 200. The neutron source of the present disclosure may be a pulsed neutron source. Neutron source 209 discharges high-energy bursts of neutrons into the surrounding formation. The electronic pulsed neutron generator 209 is operated at a rate of, e.g., approximately 10 MHz, so that each burst takes place within a 100 microsecond window. Gamma rays produced via interaction of the discharged neutrons and the formation are detected at the scintillation detector 212 attached to acquisition and telemetry electronics 215. A power supply 201 is provided. Electronics 203 enable the neutron source 209. A neutron shield 220 attenuates the neutron flux propagating directly from the source 209 to the detector 212.

FIG. 3 illustrates example components of a logging string of the present disclosure. The instruments on the logging string 301 may include: a pulsed neutron tool 302 of the kind described above; a density tool 303, a natural gamma ray tool 305; a neutron porosity tool 304. The natural gamma ray tool 305 provides data that is processed to give elemental information on Potassium (K), Thorium (Th) and Uranium (U). The pulsed neutron measurements may be analyzed to give an elemental analysis of other elements using the method discussed in U.S. Pat. No. 7,205,535 to Madigan, wherein an elemental analysis of the pulsed neutron measurements is carried out. The ensemble of tools used may be referred to as a downhole assembly. Alternatively, algorithms for real-time estimation may be used, as described below with respect to FIG. 4.

Figure 4:
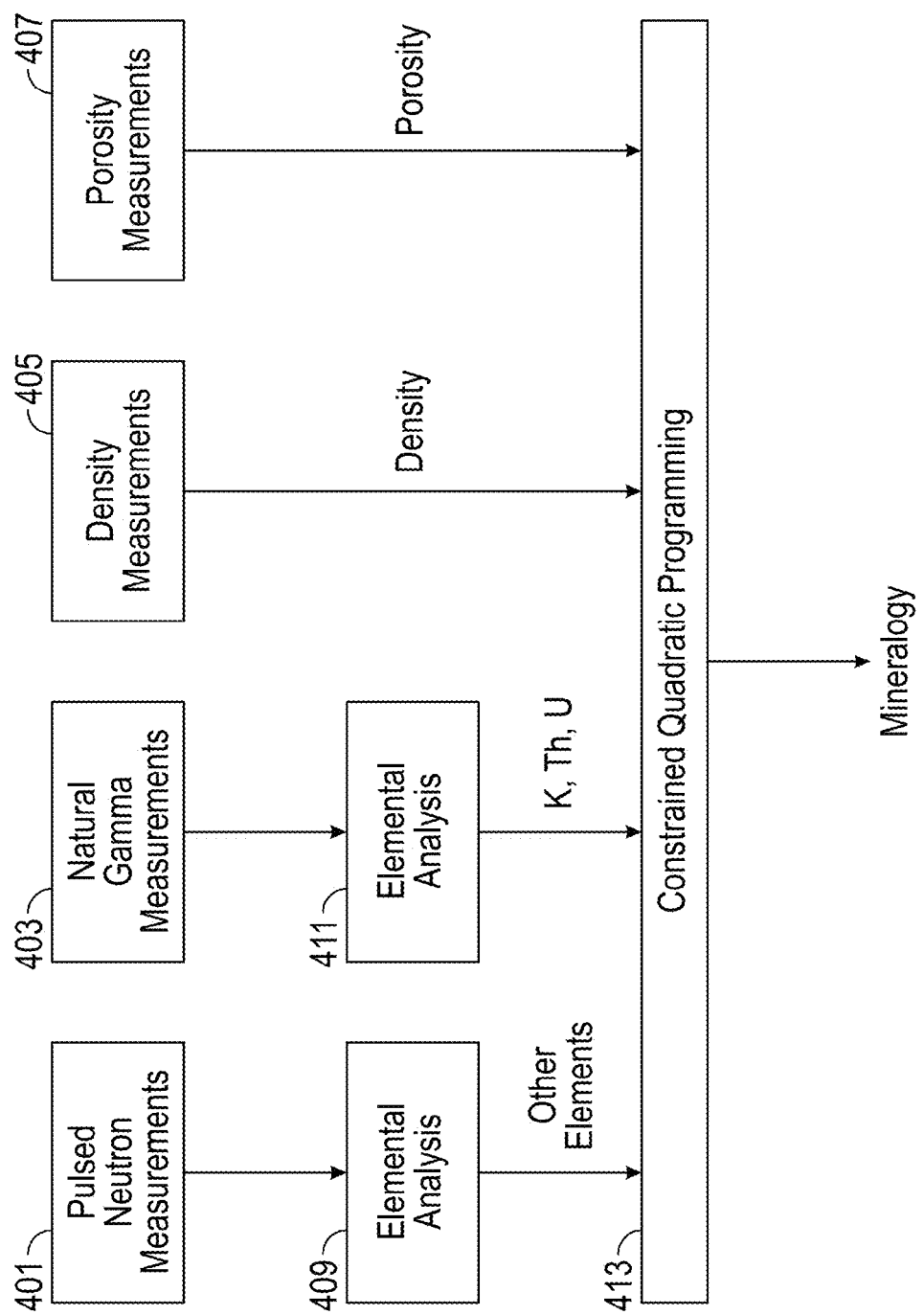
FIG. 4 shows a flow chart illustrating methods in accordance with embodiments of the present disclosure.

FIG. 4 shows a flow chart illustrating methods in accordance with embodiments of the present disclosure. Natural gamma ray measurements 403 are subjected to an elemental analysis 411 to give an estimate of K, Th, and U. Pulsed neutron measurements 401 are subject to an elemental analysis 409 to give other elements such as Ca, Cl, Fe, Mg, Si, and S. The outputs of the elemental analyses 409, 411, density measurements 405, and porosity measurements 407 are input to a constrained optimization module 413 in a processor. The output of the constrained optimization module is the mineralogy. The set of possible minerals in the earth formation is an input to the optimization module 413.

As the name implies, quadratic programming includes a quadratic objective function of the form $$g^T x + \frac{1}{2} x^T H x. \quad (1)$$

As in prior art methods, other constraints are present. These include:

Bound constraints: $bl \leq x \leq bu$ (2), linear constraints: $Ax \leq b$ (3), and non-linear constraints: $C(x) \leq 0$ (4).

Here, g is the gradient of f at the current point x, f is the objective function, H is the Hessian matrix (the symmetric matrix of second derivatives). The objective function for this application can be expressed as:

$$f = \sum_i^k \frac{(Logdata_i - f_i(Component\_volumes))^2}{Var_i}. \quad (5)$$

The objective function f is minimized at each sample (depth) of the logs independently of the other depths. There are a total of k input logs, denoted by $Logdata_i$. These may include density, porosity, and photoelectric factor (PE) as well as the logs 409, 411 from elemental analysis. The function $f_i$ relates the mineralogy at each depth to the value of the i-th log. The weighting function $Var_i$ gives different weights to the different logs depending upon their accuracy. Generally speaking, density and porosity measurements have the largest weights.

The allowable minerals may include, but are not limited to, quartz, albite, anorthite, microcline, calcite dolomite, siderite, kerogen, pyrite, hematite, anhydrite, glauconitic, chlorite (iron), chlorite, chlorite (mg), kaolinite, smectite, smectite (iron), illite, illite (iron) and fluid. Other logs and minerals can be added if the tool response is known.

Figure 5:
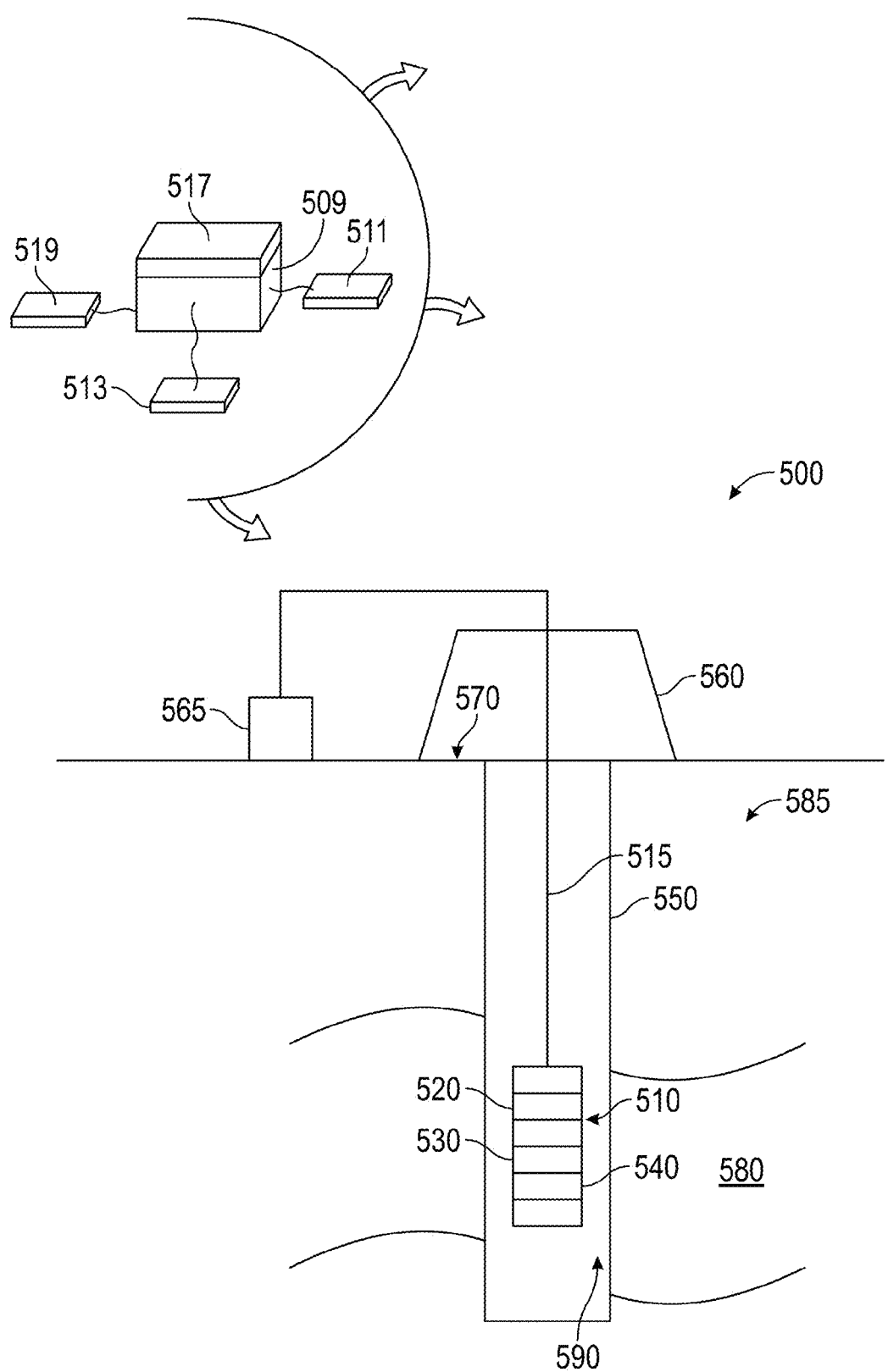
FIG. 5 schematically illustrates a system having a downhole tool configured to acquire resistivity information in a borehole intersecting a volume of interest of an earth formation in accordance with embodiments of the present disclosure.

FIG. 5 schematically illustrates a resistivity imaging system 500 having a downhole tool 510 configured to acquire information for producing a resistivity image of the earth formation 580 or another parameter of interest of a formation 580 using at least one electrical sensor 540. The system 500 may include a conventional derrick 560 erected on a derrick floor 570. A conveyance device (carrier 515) which may be rigid or non-rigid, may be configured to convey the downhole tool 510 into wellbore 550 in proximity to a volume of interest 580 of an earth formation 585. The carrier 515 may be a drill string, coiled tubing, a slickline, an e-line, a wireline, etc. Downhole tool 510 may be coupled or combined with additional tools e.g., some or all the information processing system (inset). Thus, depending on the configuration, the tool 510 may be used during drilling and/or after the wellbore 550 has been formed. While a land system is shown, the teachings of the present disclosure may also be utilized in offshore or subsea applications. The carrier 515 may include embedded conductors for power and/or data for providing signal and/or power communication between the surface and downhole equipment (e.g., a seven conductor cable). The carrier 515 may include a bottom hole assembly, which may include a drilling motor for rotating a drill bit.

Drilling fluid ('mud') 590 may be present between the formation 585 and the downhole tool 510, such that drilling fluid 590 affects the value of resistivity measurements obtained from the formation. The tool 510 may be in contact with earth formation 585 when performing various measurement operations. The point of contact may be sensor(s) 540 in contact with the earth formation 585. Sensor(s) 540 may be retractable (e.g., mounted on an extending arm), and may be in contact with the earth formation 585 at the borehole wall or with downhole fluid 590.

A surface control system 565 receives signals from downhole sensor(s) 540 and other sensors used in the system 500 and processes such signals according to programmed instructions provided to the surface control system 565. The surface control system 565 may display desired parameters and other information on a display/monitor that is utilized by an operator. The surface control system 565 may further communicate with a downhole control system 520 at a suitable location on downhole tool 510. The surface control system 565 may process data relating to the operations and data from the sensors 540, and may control one or more downhole operations performed by system 500.

In one embodiment, electronics 530 associated with sensors 540 may be configured to record and/or process the information obtained. Certain embodiments of the present disclosure may be implemented with a hardware environment that includes an information processor 517, an information storage medium 513, an input device 511, processor memory 509, and may include peripheral information storage medium 519. The hardware environment may be in the well, at the rig, or at a remote location. Moreover, the several components of the hardware environment may be distributed among those locations. The input device 511 may be any data reader or user input device, such as data card reader, keyboard, USB port, etc. The information storage medium 513 stores information provided by the detectors. Information storage medium 513 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 513 stores a program that when executed causes information processor 517 to execute the disclosed method. Information storage medium 513 may also store the formation information provided by the user, or the formation information may be stored in a peripheral information storage medium 519, which may be any standard computer information storage device, such as a USB drive, memory stick, hard disk, removable RAM, or other commonly used memory storage system known to one of ordinary skill in the art including Internet based storage. Information processor 517 may be any form of computer or mathematical processing hardware, including Internet based hardware. When the program is loaded from information storage medium 513 into processor memory 509 (e.g. computer RAM), the program, when executed, causes information processor 517 to retrieve detector information from either information storage medium 513 or peripheral information storage medium 519 and process the information to estimate a parameter of interest. Information processor 517 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the detectors may be configured to take measurements at a plurality of azimuthal orientations as the tool moves along the longitudinal axis of the borehole ('axially') using at least one sensor 540. These measurements may be substantially continuous, which may be defined as being repeated at very small increments of depth and azimuth, such that the resulting information has sufficient scope and resolution to provide an image of borehole parameters (e.g., electrical properties of the formation at the borehole.

In other embodiments, electronics may be located elsewhere (e.g., at the surface, or remotely). To perform the treatments during a single trip, the tool may use a high bandwidth transmission to transmit the information acquired by detectors 520, 530 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

One point of novelty of the system illustrated in FIG. 5 is that the surface control system 565 and/or the downhole control system 520 are configured to perform certain methods (discussed below) that are not in the prior art. A surface control system or downhole control system may be configured to control the tool described above and any incorporated sensors and to estimate a parameter of interest according to methods described herein. In some embodiments the tool strings of FIGS. 1A & 1B and FIG. 5 may be combined in a single implementation.

Techniques of the Present Disclosure

Figure 6A:
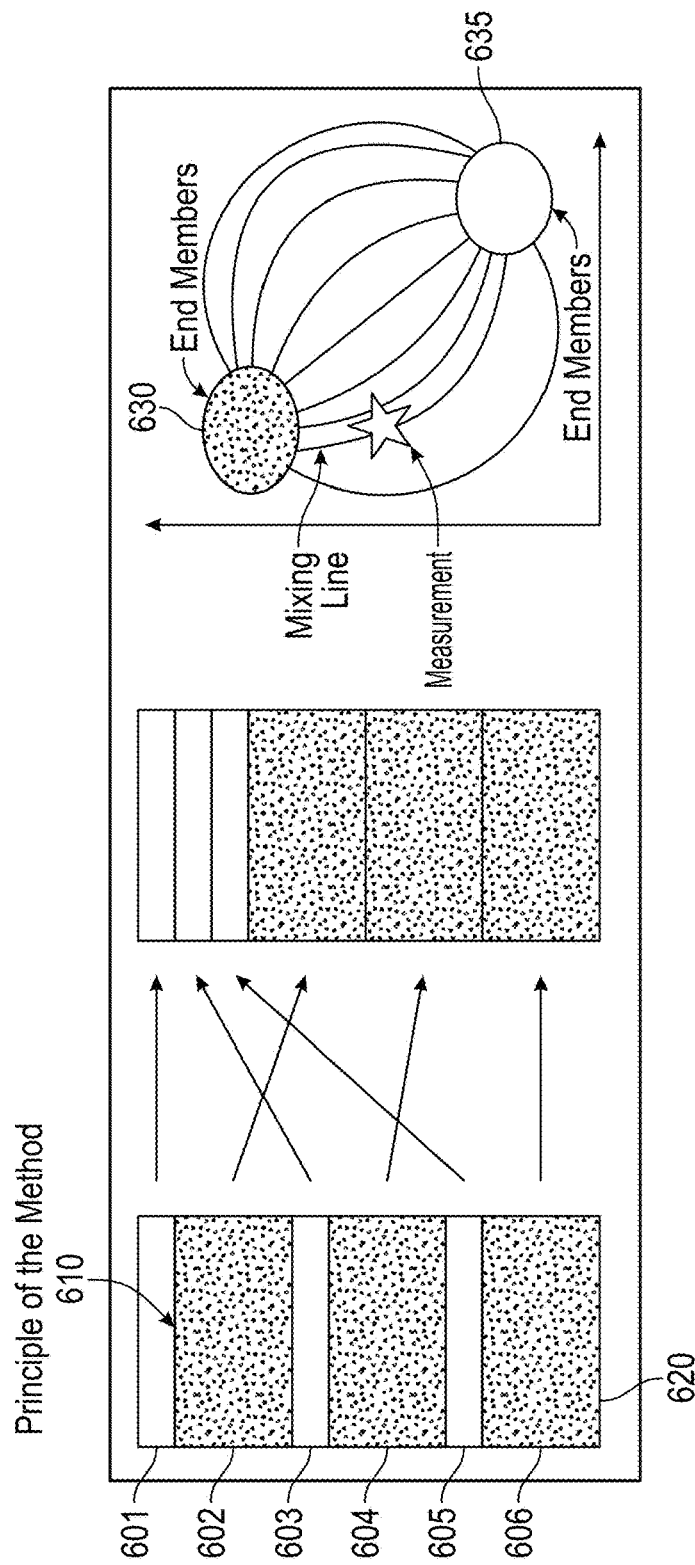
FIG. 6A-6D illustrates techniques in accordance with embodiments of the present disclosure.

FIG. 6A-6D illustrates techniques in accordance with embodiments of the present disclosure. Referring to FIG. 6A, for a mineralogy tool having a coarse vertical resolution (e.g., 1 foot or greater), it is not possible to resolve accurately a layer thinner than about 1 foot. Below that resolution, the composition of each layer is averaged. Information is used from a log with a fine vertical resolution (e.g., 1 millimeter to 10 centimeters) to determine the amount of each lithology in each of a plurality of thin bedded intervals. A thin bedded interval is an interval of 1 foot or less in axial length that contains more than one lithology (e.g., more than one layer). If we consider that the mineralogy of each lithology remains approximately constant over a specific interval, then the bulk composition of the entire interval should correspond to the average of the composition for each lithology weighted by its respective thickness in this interval. That is, the mineralogical composition of each lithology is calculated so that the average weighted by the thickness of each lithological interval corresponds to the mineralogy estimated from the pulse neutron tool measurements. In some cases, the tool will provide the estimated mineralogy based on a plurality of measurements.

The neutron log yields a bulk composition over the interval, and the image log yields the amount of each lithology over the interval. Thus, the composition of each lithology may be modeled so that the weighted average fits the radiation measurement. The mineralogical composition is then attributed to each bed based on the lithological distribution.

Thus, techniques in accordance with embodiments of the present disclosure may include generating an image representative of the formation over an interval of borehole depth. The image may have a second resolution greater than the first resolution. This may include identifying layers 601-606 corresponding to lithotype facies within the interval. The layers may be defined by boundaries 610 having boundary locations along the borehole. Each layer comprises one of two lithological components. Techniques may further include using a unified characterization of the formation within the interval determined from the standard resolution measurements and the boundary locations within the interval to solve for a value for the formation parameter corresponding to each layer consistent with the unified characterization of the interval.

In an example workflow, first thinly bedded intervals are identified from image logs. The facies may be used to determine the proportion of each lithology from the image logs. The composition of each end member may be calculated first. Next, the position and facies of each layer may be determined in correspondence with the image log. A mineralogical composition may be assigned to each layer, resulting in a first solution 620.

If it is assumed that the mineralogical composition of an interval as measured by a radiation-based tool is the average of the mineralogical composition of each lithological component (e.g., shale, sandstone, limestone) weighted by the volume of each lithological component, the mineralogical composition can be expressed as:

$$M = m1 * t1 + m2 * t2 \ldots$$

where:

M=mineralogical composition of a specific mineral (e.g., quartz, calcite, illite, . . . )

m1: mineralogical composition of a specific mineral in lithological component 1 (e.g., shale, sandstone, limestone, . . . ).

m2: mineralogical composition of the specific mineral in lithological component 2.

T=thickness of the investigated interval t=cumulative thickness of a lithological component expressed as a fraction of the total thickness of the investigated interval.

Figure 6B:
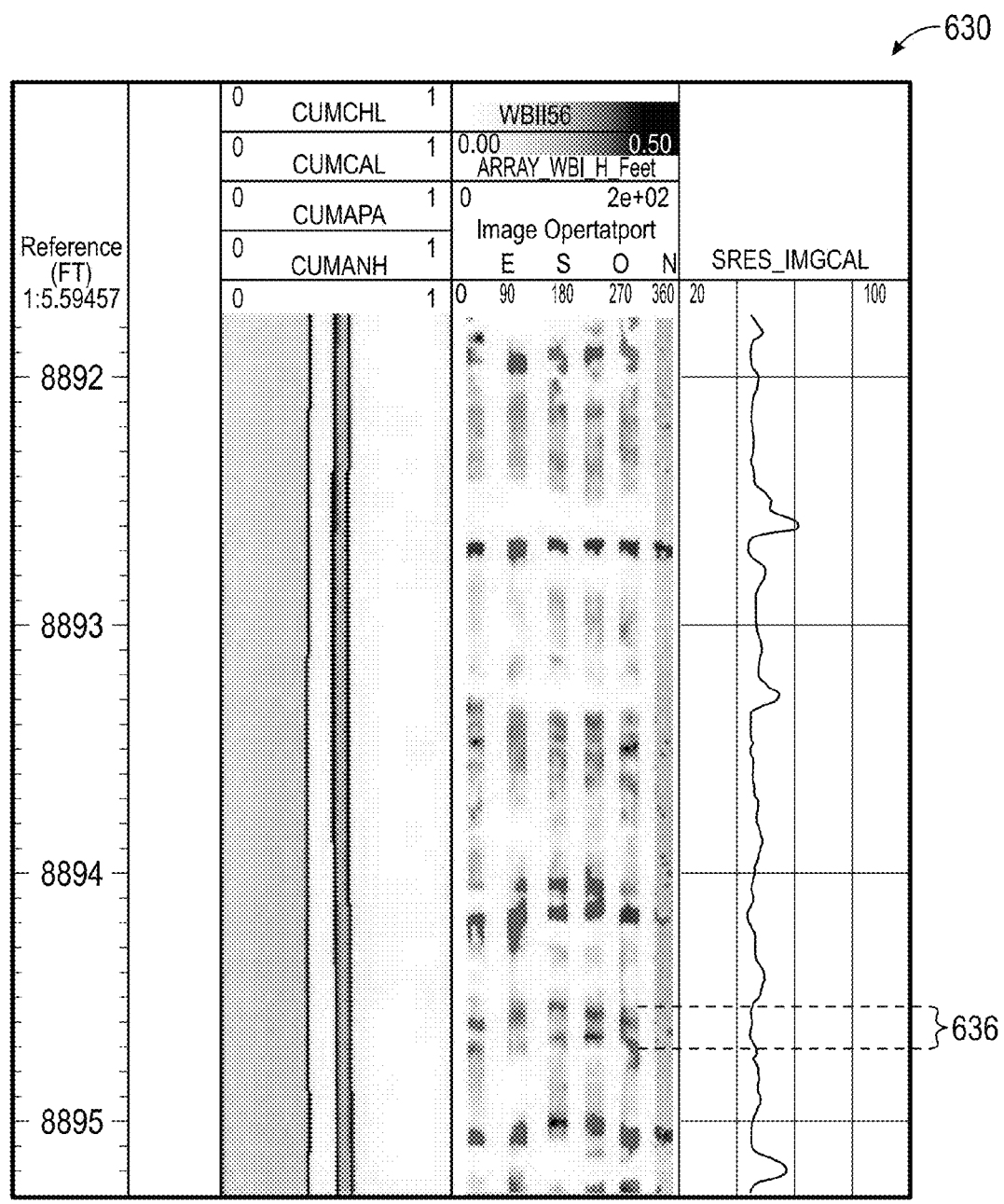

Referring to FIG. 6B, interval thickness T may be determined by the operator by selecting a working zone 636 corresponding to an interval with consistent mineralogical composition and image response within a graphical user interface 630. M is measured by the mineralogy tool and associated with the interval, and t1, t2 . . . tx are determined from the image log, as described above. The goal of processing is to determine m for each lithological component. In some instances, it may be advantageous to choose the interval thickness T so that only two lithological components occur in the interval, as more lithological components will lead to under-determination of the system and non-uniqueness in the solution.

Figure 6C:
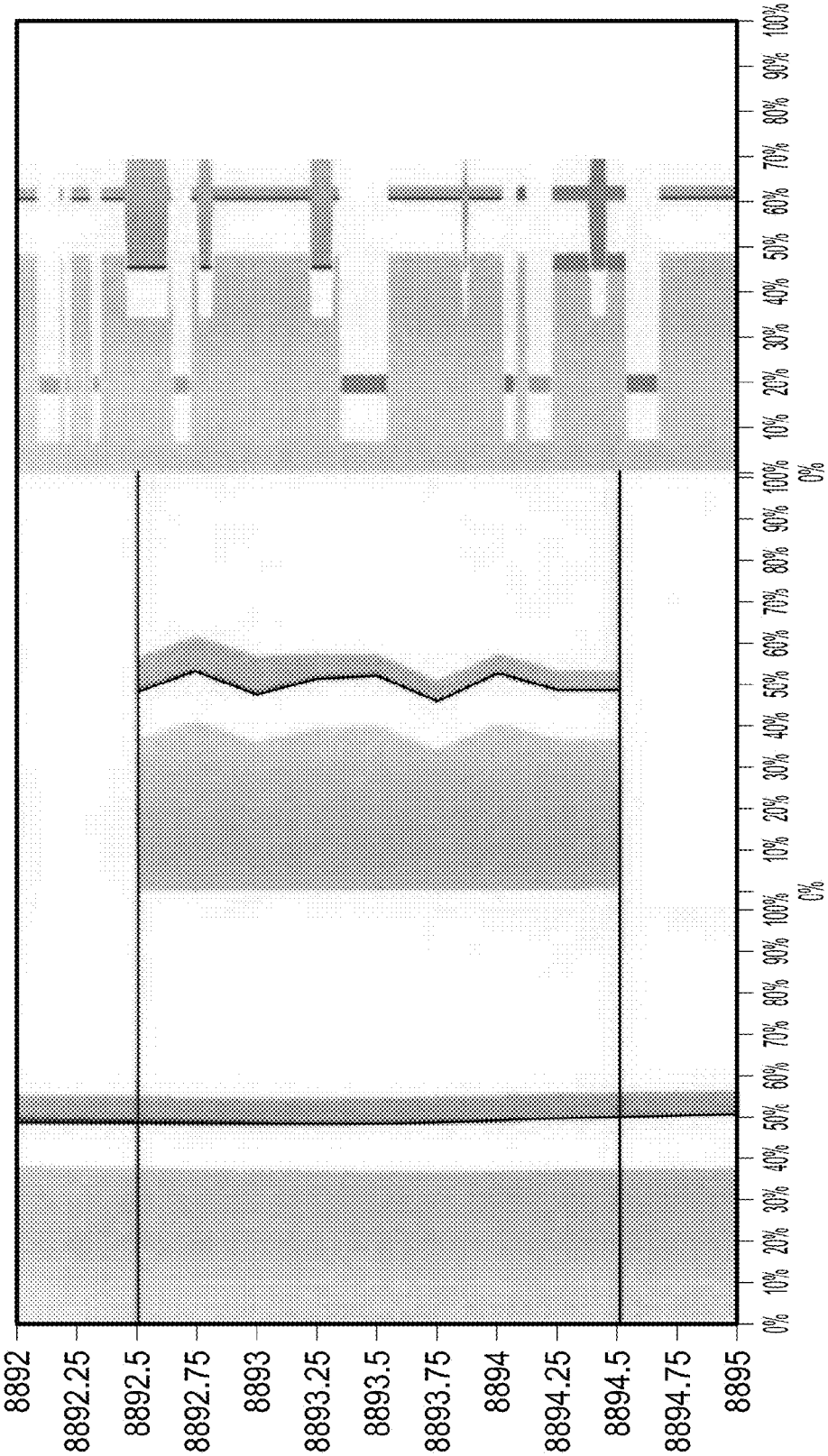

At this stage, a quality control analysis may be performed. As one example, a moving average at the resolution of the coarse log (e.g., radiation measurement log) may be checked for fit with the radiation measurement. FIG. 6C illustrates a comparison of the mineralogy (e.g., apportionment of the mineralogical compositions) resulting from the composite core values in low and high resolution with the mineralogy of the nuclear spectroscopic tool. The low resolution is generated by upscaling the high resolution composite core image to the resolution of the nuclear tool measurement by using a one foot moving average.

A curve may be generated of the mineralogy, the processed image, the facies, and the high resolution image; and displayed, stored, or transmitted. Alternatively, values of the mineralogy, the processed image, the facies, and the high resolution image may be displayed, stored, or transmitted, or used as inputs to a model of the formation.

Figure 6D:
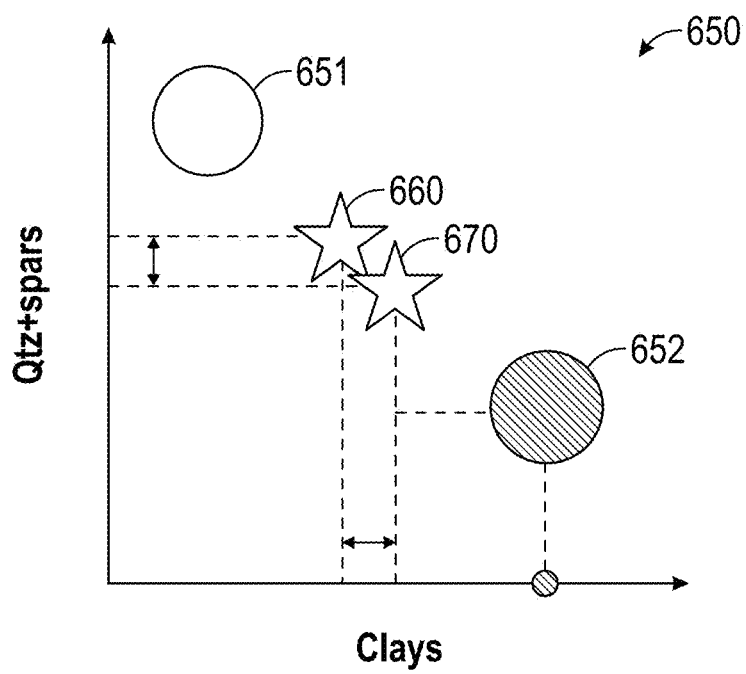

Referring to FIG. 6D, a graphical user interface ('GUI') solver suite ('graphical solver') may be used to find the solution. In the graphical solver 650, allowable lithologies may be presented for selection. The user may be enabled to modify the mineralogical composition for one of the lithology, the other one being automatically recalculated. Considering that the mineralogical composition is a weighted average of each lithology where the weighting coefficients are the cumulated thickness of each lithology over the interval, recalculating the second composition is a matter of proportionality.

Here, the graphical indicia points representing the makeup of lithology 1 (651) and lithology 2 (652) can be moved in the interactive plot area so that the automatically calculated input weighted average indicia 670 (shown here as a star of a first color) matches the fixed point measured composition indicia 660 (shown as a star of a second color). It is assumed that the composition of both lithologies remains the same over the processed interval. In this case, the mineralogical compositions for each lithology may be dependent on each other but the solution may be configured to fulfill the condition that the weighted average of the two lithologies will fit the estimated mineralogical composition over the interval. The composition of an end member 630, 635 can be inferred from a nearby layer provided that it presents only one facies and has a thickness of at least 3 feet. The mineralogy may be solved using a series of cross plots or ternary plots. A sequential approach can be applied where the primary components (Qz, spars, clays, carbonates) are determined in a first pass, and the composition of each component is determined in a second pass.

In other embodiments, components may be expressed either as a weight fraction (excluding porosity) or as a volume (if porosity is available). The model may include:
the fraction/volume of shale=sum of illite, smectite, kaolinite, chlorite, glauconite and zeolites
the fraction/volume of sand=sum of quartz, plagioclases and K-feldspars
the fraction/volume of carbonates=sum of calcite, dolomite and siderite
the fraction/volume of anhydrite
the fraction/volume of pyrite
the volume of water
the volume of oil
the volume of gas The mineralogical composition of each component may be fixed; e.g., it is assumed that the mineralogical composition of "shale", "sand", and so on remains constant over the interval. The process would then be similar to that described above with respect to FIG. 6B. The operator may determine the amount of "shale", "sand", "carbonate", and so on in one lithology and the composition of the other one will be automatically calculated assuming the estimated mineralogy is the weighted average of the two lithologies. One advantage of this implementation is the ability to decrease the number of available parameters for variation by packaging them in components of fixed mineralogical composition to reduce processing time. If the mineralogical composition of the components is insufficient, that is, if the average of the two lithologies will diverge from the mineralogical composition measured, optimization may be carried out for: the composition of each component; and the composition of each lithology.

In another algorithm applicable to non-complex mineralogy (e.g., two lithologies, simple mineralogy, and linear relations), a mathematical solution is reached using an appropriate workflow. A composition of a first lithology may be assumed based on the composition of a nearby thick layer serving as a reference layer. The reference layer may consist of a single lithology and be at least three feet thick to avoid shoulder effects. The composition of the other lithology may be calculated so that it satisfies the mineralogical composition over the interval estimated from the radiation-based measurement tool. The average of each mineralogy weighted by thickness is calculated and fit against the mineralogy measured with the radiation-based measurement tool.

Alternatively, a complex mineralogy algorithm may be employed if more than two lithologies are present in the interval. A composition is entered as a starting point for one lithology. A Monte Carlo simulator calculates a series of possible compositions within specified boundaries. The composition of the other lithology is calculated so it satisfies the condition (e.g., weighted average fitting to the radiation-based measured composition). In the alternative, all lithologies may be modeled simultaneously as two independent sets of parameters, such that the weighted average of all the lithologies must fit the FLeX measured composition.

Constrained Sampling for Mineralogy Estimation

In an example embodiment, lithology information from a radiation-based measurement tool (e.g., the FLeX tool described above) may be processed to improve resolution of the measurements by constrained sampling. The Flex data provides a mineral volume fraction denoted by $I_m$ integrated over the entire borehole interval. The minerals are indexed by m=1, . . . M. From a facies analysis, the volume fractions $\xi_j$ of layers j=1, . . , J are known. A proposition of lithologies is made—that is, a solution is proposed wherein each layer is assigned a lithology. Associated with each lithology are a set of probability density functions ('pdf') $p_{(m,j)}$ ($x_{(m,j)}$) that quantify the probability that the mineral m has a volume fraction of $x_{(m,j)}$ in layer j. These pdfs may be obtained from a reference database. Markov chain Monte Carlo ('MCMC') methods may be used to find the most likely $x_{(m,j)}$ for all m and j. However, this may require the generation of a uniformly distributed sample over the space of all permissible $x_{(m,j)}$.

Both equality and inequality constraints are present. The inequality constraints are self-evident:

$$0 < x_{(m,j)} < 1. \quad (1)$$

There are two types of equality constraints. First, the sum of mineral contents over all layers weighted by the volume fraction of each layer must equal the mineral content estimated from the coarse mineralogy tool:

$$\sum_{j=1}^{J} \xi_j x_{m,j} = I_m. \quad (2)$$

In addition, a lithology assigned to layer j might have a zero probability to have any traces of mineral m in it:

$x_{(m,j)}=0$, for some m',j'; total number of these constraints K, wherein K<J-1. If K=J-1, then the problem is uniquely determined.

In order to create a uniformly distributed sample that satisfies Eqns. (1)-(3), it is practical to create samples for each mineral m separately. First, the equality constraints are considered. They are represented by the matrix E:

$$Ex=r, \quad (4)$$

where $$x=[x_{(m,1)}, x_{(m,2)}, \ldots, x_{(m,J)}]^T, \text{ m is fixed} \quad (5a)$$

$$r=[I_m, 0, \ldots, 0]^T, \text{ where length is J} \quad (5b)$$

and where the first row of E is given by the vector $e=[\xi_1, \xi_2, \ldots, \xi_J]$, and all other entries are zero, unless Eq. (3) holds, in which case $E_{(k,j)}=1$, were k is a running index over all Eq. (3) constraints.

There always exists an x that satisfies Eq. (4) and hence there are infinitely many solutions to Eq. (4). The matrix E is rank deficient. Its nullspace has a rank N=J-1-K which can be determined by a series of mathematical methods, such as, for example, single value decomposition. The spanning vectors $z_n$, n=1, . . . , N are collected in the matrix Z of dimensions J×N. The complete set of solutions of Eq. (4) can then be written as:

$$x=x_0+Zq, \quad (6)$$

where $x_0$ is a particular solution that can be analytically solved; e.g., it may be computed using the Moore-Penrose inverse:

$$x_0=E^{-1}r. \quad (7)$$

It is possible to create random samples of x by uniformly sampling q, but the limits within which to sample $q_n$ to limit $x_{(m,j)}$ to within 0 and 1 are unknown. The inequality constraints Eq. (1) define a J-dimensional box (or hyperbox) that the valid sample existing on the N-dimensional hyperplane given by Eq. (6) is constrained to. By extending the hyperbox Eq. (1) to the smallest enclosing hypersphere given by:

$$(x-x_{or})^T(x-x_{or})=\frac{1}{2}, \quad (8)$$

and using rejection if Eq. (1) is violated, the solution becomes much less computation intensive. The origin $x_{or}$ is given by $x_{or}=[\frac{1}{2}, \ldots, \frac{1}{2}]$. Substituting Eq. (6) into Eq. (8) leads to:

$$\vec{q}^T Z^T Z \vec{q} - \vec{q}^T Z^T \delta \vec{x} - (Z^T \delta \vec{x})^T \vec{q} + \delta \vec{x}^T \delta \vec{x} = \frac{1}{2}, \quad (9)$$

where:

$$\delta \vec{x} = \vec{x}_{or} - \vec{x}_0. \quad (10)$$

The matrix $Z^T Z$ is of size N×N, has rank N and is symmetric positive definite. Therefore, a Cholesky decomposition exists that satisfies:

$$B = Z^T Z = L L^T, \quad (11)$$

where L is a lower triangular matrix of size N×N and $L^{-1}$ exists. Using Eq. (11) in Eq. (9) results in:

$$(L\vec{q})^T(L\vec{q}) - (L\vec{q})^T L B^{-T} Z^T \delta \vec{x} - \delta \vec{x}^T Z B^{-1} L^T (L\vec{q}) + \delta \vec{x}^T \delta \vec{x} = \frac{1}{2} \quad (12)$$

Now we define $L\vec{q}=\vec{z}$ and $\delta \vec{z}=LB^{-T}Z^T \delta x$. This results in:

$$\vec{z}^T \vec{z} - \vec{z}^T \delta \vec{z} - \delta \vec{z}^T \vec{z} + \delta \vec{z}^T \delta \vec{z} = \frac{1}{2} + \delta \vec{z}^T \delta \vec{z} - \delta \vec{x}^T \delta \vec{x}. \quad (13)$$

It is known that $\vec{z}$ can be inside the sphere defined by origin $\delta \vec{z}$ and radius $$\text{radius} = \sqrt{\frac{1}{2} + \delta \vec{z}^T \delta \vec{z} - \delta \vec{x}^T \delta \vec{x}}. \quad (14)$$

Figure 7:
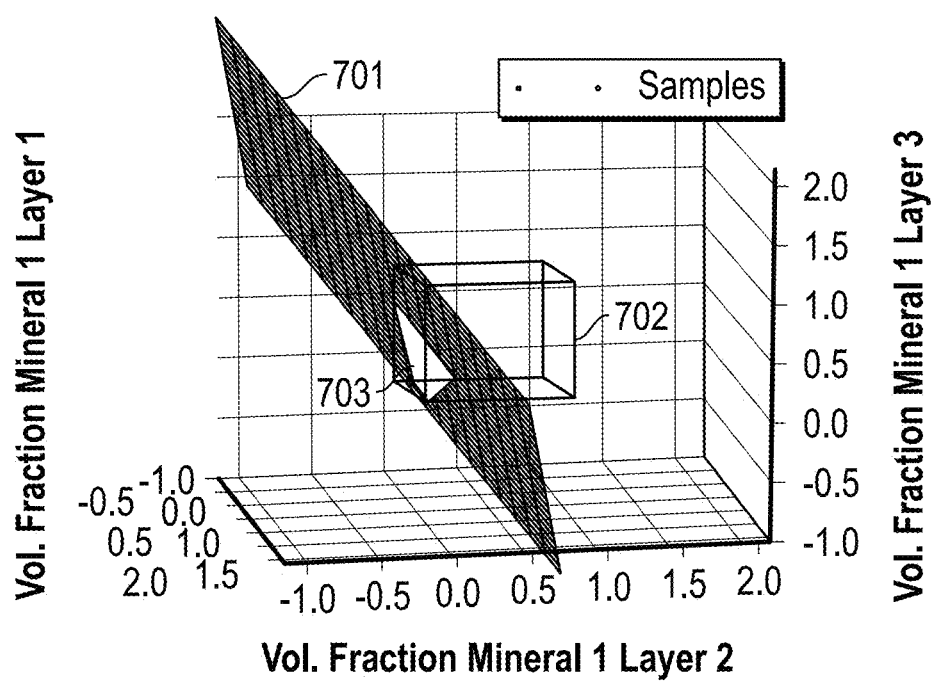
FIG. 7 illustrates techniques for constrained sampling in accordance with embodiments of the present disclosure.

It is thus desirable to uniformly sample $\vec{z}$ in the hypersphere of dimension N; sample algorithms are described hereinbelow. Next compute $\vec{q}=L^{-1}\vec{z}$. Finally, estimate $\vec{x}$ from Eq. (6) and reject if Eq. (1) is not satisfied. A simple example of sampling a 3-dimensional problem, i.e. 3 layers, for one mineral is depicted in FIG. 7 below. The layers 1-3 have volume fractions 0.2, 0.5, and 0.5, respectively. Mineral one has a total volume fraction of 0.2 over the whole interval. The sampled variables are the volume fraction of mineral one in each layer.

FIG. 7 illustrates techniques for constrained sampling in accordance with embodiments of the present disclosure. In FIG. 7, 10,000 samples are taken and plotted over the three-dimensional space. The inequality constraints are indicated by box and the plane 701 represents the equality constraints. The constrained samples 703 in the three-dimensional phase space obey both the equality and inequality constraints. The constrained sample space may be randomly sampled. Although more efficient techniques are available in many cases, random sampling may be useful in some situations.

Constrained Sampling using Random Walk

A novel technique described directly below drastically improves efficiency in determining solutions in high-dimension problems, such as mineralogy analysis, as it does not require rejection. By high-dimension, it is meant that N is greater than 7. By relaxing the inequality constraints and allowing $$x_{(m,j,\min)} < x_{(m,j)} < x_{(m,j,\max)}, \quad (13)$$

which allows removing mineral compositions that are impossible for a certain lithology by closely bracketing the pdfs of this mineral and lithology. For example, quartz might have to have a volume fraction between 0.45 and 0.9 in sandstone. The inequality constraints form a hyper-cuboid (hyper-box) in high-dimensional space.

By assuming that a vector x exists satisfying Eqns. (6) and (13), it is possible to sample another random vector y satisfying the equality constraints Eq. (6) but not the inequality constraints Eq. (13). This can be accomplished by randomly sampling q and by then using Eq. (6). Computing the vector d=x−y which is within the hyper-plane defined by Eq. (6), a new point p=x+s d is generated. The step size may be determined, as shown below.

The limits on the step size are computed by first computing $s_{(m,j,\min)}$ and $s_{(m,j,\max)}$:

$$s_{m,j,\min} = \min\left(\frac{x_{m,j,\min} - x_{m,j}}{d_{m,j}}, \frac{x_{m,j,\max} - x_{m,j}}{d_{m,j}}\right), \quad (14)$$

$$s_{m,j,\max} = \max\left(\frac{x_{m,j,\min} - x_{m,j}}{d_{m,j}}, \frac{x_{m,j,\max} - x_{m,j}}{d_{m,j}}\right).$$

It follows for s that:

$$\min(s_{(m,j,\min)}) < s < \max(s_{(m,j,\max)}). \quad (15)$$

A first version of the technique samples uniformly between its minimum and maximum value given in Eq. (15). A second version of the technique divides the range between the minimum and maximum of s in Eq. (15) into P equal intervals, and computes for each point the joint pdf value (P+1 value). The value for s that yields the largest value is selected. Both algorithms will provide the most probable mineralogy composition for the selected layer.

Figure 8A:
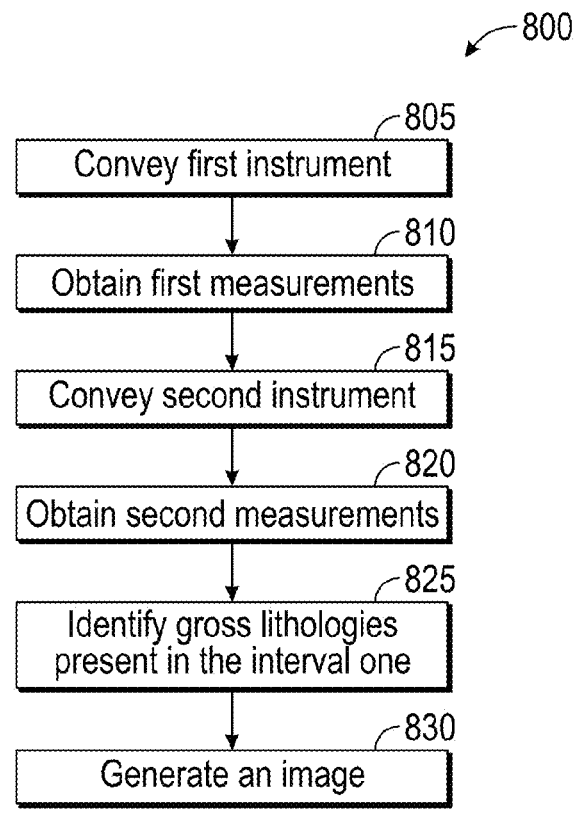
FIG. 8A illustrates a method for evaluating an earth formation intersected by a borehole in accordance with embodiments of the present disclosure.

FIG. 8A illustrates a method for evaluating an earth formation intersected by a borehole in accordance with embodiments of the present disclosure. Optional step 805 comprises conveying a first standard resolution instrument in the borehole. Optional step 810 comprises obtaining standard resolution measurements of the earth formation surrounding the borehole. The standard resolution measurements have a first resolution resulting from a downhole instrument used to obtain the measurements. Optional step 815 comprises conveying a second, higher resolution, instrument in the borehole. The second downhole instrument may include at least one of: i) an acoustic imager; ii) a resistivity imager; iii) an RF imager; and iv) a nuclear imager. Optional step 820 comprises obtaining high resolution measurements of the earth formation surrounding the borehole. The second downhole instrument has a resolution greater than the first resolution of the first instrument. Optional step 825 comprises identifying those gross lithologies (selected from a set of gross lithologies) present in the interval. The set of gross lithologies may include: i) sandstone; ii) shale; iii) limestone; iv) dolomite; v) evaporitic sedimentary rocks, vi) salts and vii) igneous and metamorphic rocks.

Step 830 comprises generating an image representative of the formation over an interval of borehole depth. The image has a second resolution greater than the first resolution. Step 830 may be carried out by: identifying layers corresponding to lithotype facies within the interval; and using a unified characterization of the formation within the interval determined from the standard resolution measurements and the boundary locations within the interval to solve for a value for the formation parameter corresponding to each layer consistent with the unified characterization of the interval.

Layers may be detected in a manner similar to detecting bed boundaries (e.g., using a resistivity image). The image log information may be used to locate the thinly bedded intervals. The lithological units of the radiation information may be adjusted to correspond to the boundaries recognized on the image log.

The unified characterization may be an average value for the formation parameter within the interval. The formation parameter may be a lithological parameter. For example, the formation parameter may include a gross lithology, including a gross lithology selected from a set of gross lithologies consisting of: i) sandstone; ii) shale; iii) limestone; iv) dolomite; v) evaporitic sedimentary rocks, vi) salts and vii) igneous and metamorphic rocks. Identifying the layers may be carried out using a borehole image from the second downhole instrument having a resolution greater than the first resolution.

An additional optional step may include estimating dimensions of each layer. The layers may be defined by boundaries having boundary locations along the borehole. The unified characterization may include or be represented by a fraction of each of a plurality of mineral constituent solids forming a rock matrix within the interval, wherein each mineral constituent solid of the plurality of mineral constituent solids has a defined chemical composition. The unified characterization may alternatively include or be represented by a composition of the interval comprising at least one of: i) a bulk elemental composition; and ii) a bulk mineralogical composition.

As an example, as bed thickness can be measured on the images, it allows discriminating intervals with a homogeneous lithology from intervals constituted by a succession of thin layers with different lithologies. If these layers are thinner than 1-2 ft, the radiation logs may not resolve them individually. For example, a radiation based evaluation may result in a characterization of "shaly sandstone." This could be a homogeneous argillaceous sandstone or a heterogeneous succession of thin layers of sandstones and shales.

Solving for the value for the formation parameter corresponding to each layer may include generating a plurality of solutions, with each solution including values for the formation parameter corresponding to each layer, and determining an optimal solution from the plurality of solutions providing a maximum combined likelihood for the values for the formation parameter.

Figure 8B:
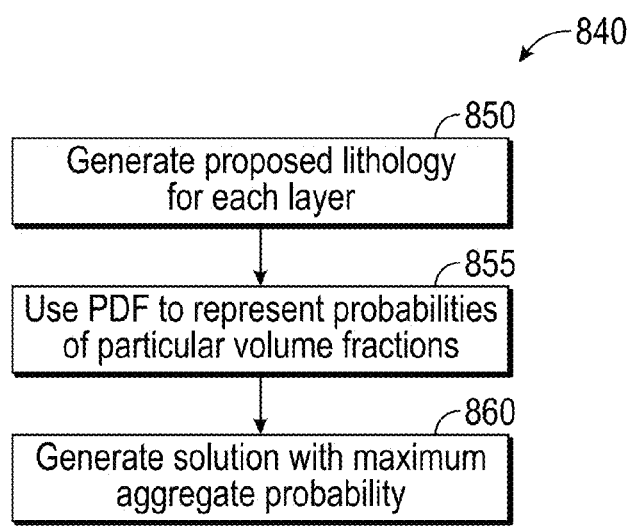
FIG. 8B illustrates a method 840 for solving for the value for the formation parameter corresponding to each layer in accordance with embodiments of the present disclosure.

FIG. 8B illustrates a method 840 for solving for the value for the formation parameter corresponding to each layer in accordance with embodiments of the present disclosure. Solving for the value for the formation parameter may be carried out by estimating the most likely volume fraction for each mineral in each layer.

Step 850 includes generating at least one proposed lithology for each layer. Step 855 includes representing a probability for particular volume fractions in a range of volume fractions for each mineral in each layer using a corresponding probability distribution function. Step 860 includes generating a solution that has a maximum aggregate probability by using the corresponding probability distribution functions to estimate the most likely volume fraction for each mineral in each layer.

Generating the solution may include, for each mineral volume fraction: identifying equality constraints and inequality constraints from the existing data; defining a solution space for the respective mineral volume fraction based on inequality constraints; determining for the respective mineral volume fraction a solution surface based on equality constraints; determining the solution surface within the solution space representing both equality constraints and inequality constraints on possible values; and performing sampling on the solution surface to determine the solution having the maximum probability for the respective mineral volume fraction. The solution space may be a high-dimensional solution space. Performing sampling may be carried out by sampling at uniform intervals from the initial solution on the solution surface.

Alternatively, performing sampling may be carried out by initially determining a starting point on the solution surface satisfying the inequality constraints, the starting point initiated as the initial solution; determining a random direction on the surface; and estimating the point with the maximum probability for the respective mineral volume fraction by taking samples along the randomly selected direction at intervals from the starting point; calculating a probability for each sampled point; and using the point associated with a new maximum as a new starting point. In some implementations, maximum step sizes may be computed that are consistent with inequality constraints; estimating the point with the maximum probability for the respective mineral volume fraction by may be carried out by taking samples along the randomly selected direction at varying intervals from the starting point within the maximum step sizes.

In alternative embodiments, the composition of each lithology may be generated by a random sampling process (e.g., Monte-Carlo methods). The weighted average of each lithology may then be compared to the estimated mineralogy over the same interval. The result may then be optimized to minimize the misfit between the average composition and the tool estimated composition.

Petrophysical components may also be used, such as:
the fraction/volume of shale=sum of illite, smectite, kaolinite, chlorite, glauconite and zeolites
the fraction/volume of sand=sum of quartz, plagioclases and K-feldspars
the fraction/volume of carbonates=sum of calcite, dolomite and siderite
the fraction/volume of anhydrite
the fraction/volume of pyrite
the volume of water
the volume of oil
the volume of gas The optimization process should concern both: the composition of each component; and the composition of each lithology. For each component, the operator may provide a range of composition assorted with a statistical distribution. The solution is optimized by minimizing the fit between the weighted average of the two lithologies to the estimated composition over the interval from radiation tool measurements.

The mineralogical composition calculated may be associated with each of the electro-facies determined on the image. Then, based on the image log, the mineralogical composition may be redistributed as a function of depth, with each sedimentary "object" (bed) having now a distinct mineralogical composition.

Porosity may be included in the analysis in several implementations. For example, porosity can be processed as one of the petrophysical volumes. In the alternative, a total porosity curve can be calculated from the difference between the grain density and the bulk density. Porosity may be estimated assuming it is saturated with water, or assuming a variable fluid density; in this case, saturation and density curves may be obtained for each component of the fluid (water, oil, gas) at the required sampling rate. Porosity may be estimated assuming a variable fluid density in cases where no saturation curve is provided; in this case, a simple saturation curve may be calculated based on ground information; hydrocarbons may be discriminated on a density basis if the information provided allows.

Figure 9:
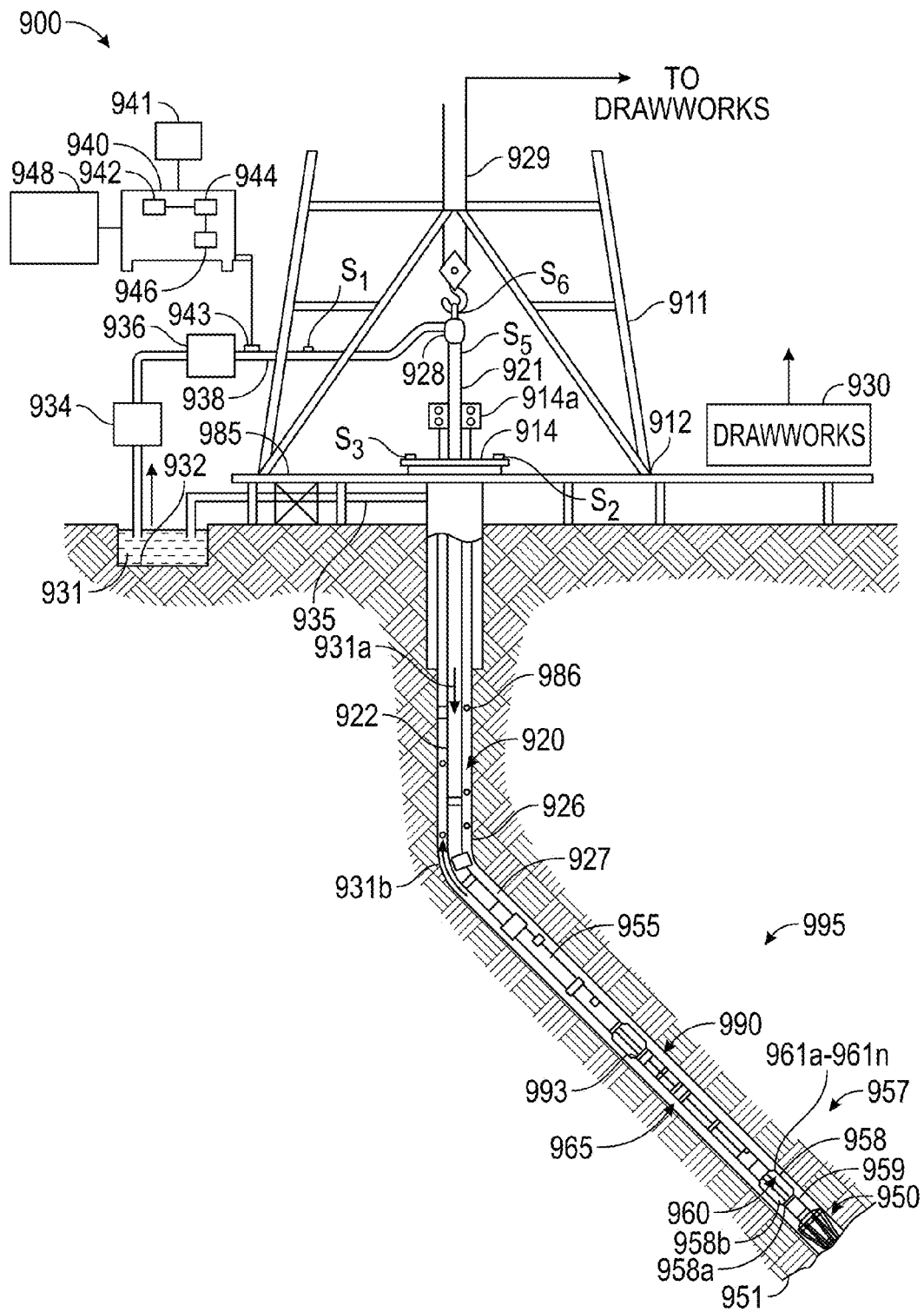
FIG. 9 illustrates an example drilling system in accordance with embodiments of the present disclosure.

Each of the embodiments herein may be used in a variety of settings in both drilling and non-drilling environments. In some implementations, the disclosed embodiments may be used as part of a drilling system. FIG. 9 is a schematic diagram of an example drilling system 900 that includes a drill string having a drilling assembly attached to its bottom end that includes a steering unit according to one embodiment of the disclosure. FIG. 9 shows a drill string 920 that includes a drilling assembly or bottomhole assembly (BHA) 990 conveyed in a borehole 926. The drilling system 100 includes a conventional derrick 911 erected on a platform or floor 912 which supports a rotary table 914 that is rotated by a prime mover, such as an electric motor (not shown), at a desired rotational speed. A tubing (such as jointed drill pipe 922), having the drilling assembly 990, attached at its bottom end extends from the surface to the bottom 951 of the borehole 926. A drill bit 950, attached to drilling assembly 990, disintegrates the geological formations when it is rotated to drill the borehole 926. The drill string 920 is coupled to a drawworks 930 via a Kelly joint 921, swivel 928 and line 929 through a pulley. Drawworks 930 is operated to control the weight on bit ("WOB"). The drill string 920 may be rotated by a top drive (not shown) instead of by the prime mover and the rotary table 914. Alternatively, a coiled-tubing may be used as the tubing 922. A tubing injector 914a may be used to convey the coiled-tubing having the drilling assembly attached to its bottom end. The operations of the drawworks 930 and the tubing injector 114a are known in the art and are thus not described in detail herein.

A suitable drilling fluid 931 (also referred to as the "mud") from a source 932 thereof, such as a mud pit, is circulated under pressure through the drill string 920 by a mud pump 934. The drilling fluid 931 passes from the mud pump 934 into the drill string 920 via a desurger 936 and the fluid line 938. The drilling fluid 931a from the drilling tubular discharges at the borehole bottom 951 through openings in the drill bit 950. The returning drilling fluid 931b circulates uphole through the annular space 927 between the drill string 920 and the borehole 926 and returns to the mud pit 932 via a return line 935 and drill cutting screen 985 that removes the drill cuttings 986 from the returning drilling fluid 931b. A sensor $S_1$ in line 938 provides information about the fluid flow rate. A surface torque sensor $S_2$ and a sensor $S_3$ associated with the drill string 920 respectively provide information about the torque and the rotational speed of the drill string 920. Tubing injection speed is determined from the sensor $S_5$, while the sensor $S_6$ provides the hook load of the drill string 920.

In some applications, the drill bit 950 is rotated by only rotating the drill pipe 922. However, in many other applications, a downhole motor 955 (mud motor) disposed in the drilling assembly 990 also rotates the drill bit 950. The rate of penetration (ROP) for a given BHA largely depends on the WOB or the thrust force on the drill bit 950 and its rotational speed.

The mud motor 955 is coupled to the drill bit 950 via a drive shaft disposed in a bearing assembly 957. The mud motor 955 rotates the drill bit 950 when the drilling fluid 931 passes through the mud motor 955 under pressure. The bearing assembly 157, in one aspect, supports the radial and axial forces of the drill bit 950, the down-thrust of the mud motor 955 and the reactive upward loading from the applied weight-on-bit.

A surface control unit or controller 940 receives signals from the downhole sensors and devices and signals from sensors $S_1$-$S_6$ and other sensors used in the system 900 and processes such signals according to programmed instructions provided to the surface control unit 940. The surface control unit 940 displays desired drilling parameters and other information on a display/monitor 941 that is utilized by an operator to control the drilling operations. The surface control unit 940 may be a computer-based unit that may include a processor 942 (such as a microprocessor), a storage device 944, such as a solid-state memory, tape or hard disc, and one or more computer programs 946 in the storage device 944 that are accessible to the processor 942 for executing instructions contained in such programs. The surface control unit 940 may further communicate with a remote control unit 948. The surface control unit 940 may process data relating to the drilling operations, data from the sensors and devices on the surface, data received from downhole, and may control one or more operations of the downhole and surface devices. The data may be transmitted in analog or digital form.

The BHA 990 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 995 surrounding the BHA 990. Such sensors are generally known in the art and for convenience are generally denoted herein by numeral 965. The BHA 990 may further include a variety of other sensors and devices 959 for determining one or more properties of the BHA 990 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 959.

The BHA 990 may include a steering apparatus or tool 958 for steering the drill bit 950 along a desired drilling path. In one aspect, the steering apparatus may include a steering unit 960, having a number of force application members 961a-961n, wherein the steering unit is at partially integrated into the drilling motor. In another embodiment the steering apparatus may include a steering unit 958 having a bent sub and a first steering device 958a to orient the bent sub in the wellbore and the second steering device 958b to maintain the bent sub along a selected drilling direction.

The drilling system 900 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. A point of novelty of the system illustrated in FIG. 9 is that the surface processor 942 and/or the downhole processor 993 are configured to perform certain methods (discussed below) that are not in prior art.

"Spectrometric" refers to measurement of a spectrum of gamma rays emitted by a formation. This may qualify the natural gamma emission of the formation or a gamma emission induced by activating the formation with high energy neutrons. Neutrons emitted by a pulsed neutron generator may interact with different nuclei, which may emit characteristic gamma rays through inelastic neutron scattering, fast-neutron reactions, neutron capture, and so on. Inelastic and fast-neutron interactions occur very soon after the neutron burst, while most of the capture events occur later, so it is possible to separate the different interactions in time after each neutron pulse (e.g., into an 'inelastic' spectrum and a 'capture' spectrum). Spectra may be analyzed, such as, for example, by counting gamma rays in energy windows, deconvolution of the spectral response curve, or by comparison with spectral standards.

An "interaction" may be described as an event causing a change in energy and direction of incident radiation (e.g., a gamma ray) prior to measurement of the radiation and absorption of the radiation. An "interaction" may induce emission of secondary radiation as well (e.g. emission of a secondary neutron and/or gamma ray). The term "absorb" refers to absorption in the sense of converting ionizing radiation, such as, for example, neutrons or gamma rays, to other detectable indicia, such as, for example, photons.

As used herein, the term "lithotype" means a geological unit characterized by an ensemble of parameters, such as, for example, specific lithology, mineralogical composition, porosity, permeability, grainsize distribution, sedimentological texture, and sedimentological structures. As used herein, the term "facies" means specific characteristic or ensemble of characteristics that individualise a body of rock and allow discriminating it from its surroundings either by way of measurement, observation, or both. As used herein, the term "unified characterization" means a bulk description of the interval in the aggregate. Example lithotype facies include sandstone, calcite cemented sandstone, shale, lime stone, and dolomite. As used herein, the term "defined chemical composition" refers to a fixed chemical composition or a composition within a specified pre-defined range of fixed chemical compositions. By dolomite, it is meant the sedimentary carbonate rock dolomite.

As used herein, the term "lithology" means a summary characterization of an ensemble of parameters including part or all of the following: color, sedimentary texture (grain size distribution, sorting, grains shape), combination of minerals in the formation having a particular set of visible, physical, and/or chemical characteristics, porosity (pore size distribution, location of pores, shape of pores), permeability (characterizing the degree of connection between the pores), occurrence of lithoclasts and/or bioclasts, sedimentary structures (e.g., bedding, lamination, bioturbation, pokemarks, casts, abrasion, erosion, variation of grainsize and/or mineralogy, desiccation cracks, root marks, compaction marks, expulsion figures), and the like.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

While the foregoing disclosure is directed to the one mode embodiments of the disclosure, various modifications will be apparent to those skilled in the art. It is intended that all variations be embraced by the foregoing disclosure.

What is claimed is:

1. A method for evaluating an earth formation intersected by a borehole using standard resolution measurements, the standard resolution measurements having a first resolution resulting from a downhole instrument used to obtain the measurements, the method comprising:
   generating an image representative of the formation over an interval of borehole depth, the image having a second resolution greater than the first resolution, by:
      identifying thinly bedded layers corresponding to lithotype facies within the interval, the layers defined by boundaries having boundary locations along the borehole;
      using a unified characterization of the formation within the interval determined from the standard resolution measurements and the boundary locations within the interval to solve for a value for the formation parameter corresponding to each layer of the thinly bedded layers consistent with the unified characterization of the interval.

2. The method of claim 1 wherein solving for the value for the formation parameter corresponding to each layer comprises generating a plurality of solutions, each solution including values for the formation parameter corresponding to each layer; and determining an optimal solution from the plurality of solutions providing a maximum combined likelihood for the values for the formation parameter.

3. The method of claim 1 wherein the unified characterization comprises a fraction of each of a plurality of mineral constituent solids forming a rock matrix within the interval, wherein each mineral constituent solid of the plurality of mineral constituent solids has a defined chemical composition.

4. The method of claim 1 wherein the unified characterization comprises a composition of the interval comprising at least one of: i) a bulk elemental composition; and ii) a bulk mineralogical composition.

5. The method of claim 1 wherein the formation parameter comprises a lithological parameter.

6. The method of claim 5 wherein the formation parameter comprises a gross lithology selected from a set of gross lithologies consisting of: i) sandstone; ii) shale; iii) limestone; iv) dolomite; v) evaporitic sedimentary rocks, vi) salts and vii) igneous and metamorphic rocks.

7. The method of claim 6 further comprising identifying those of the gross lithologies present in the interval.

8. The method of claim 1 comprising estimating dimensions of each layer.

9. The method of claim 1 wherein identifying the layers comprises obtaining a borehole image with a second downhole instrument having a resolution greater than the first resolution.

10. The method of claim 1 wherein solving for the value for the formation parameter corresponding to each layer comprises estimating the most likely volume fraction for each mineral in each layer.

11. The method of claim 10 wherein estimating the most likely volume fraction comprises:
generating at least one proposed lithology for each layer;
representing a probability for particular volume fractions in a range of volume fractions for each mineral in each layer using a corresponding probability distribution function;
generating a solution that has a maximum aggregate probability by using the corresponding probability distribution functions to estimate the most likely volume fraction for each mineral in each layer.

12. The method of claim 11 wherein generating the solution comprises, for each mineral volume fraction:
identifying equality constraints and inequality constraints from the lithotype facies;
defining a solution space for the respective mineral volume fraction based on inequality constraints;
determining for the respective mineral volume fraction a solution surface based on equality constraints;
determining the solution surface within the solution space representing both equality constraints and inequality constraints on possible values; and
performing sampling on the solution surface to determine the solution having the maximum probability for the respective mineral volume fraction.

13. The method of claim 12 wherein performing sampling comprises sampling at uniform intervals from the initial solution on the solution surface.

14. The method of claim 12 wherein performing sampling comprises:
initially determining a starting point on the solution surface satisfying the inequality constraints, the starting point initiated as the initial solution; determining a random direction on the surface; and
estimating the point with the maximum probability for the respective mineral volume fraction by taking samples along the randomly selected direction at intervals from the starting point; calculating a probability for each sampled point; and using the point associated with a new maximum as a new starting point.

15. The method of claim 14 comprising computing maximum step sizes consistent with inequality constraints; estimating the point with the maximum probability for the respective mineral volume fraction by taking samples along the randomly selected direction at varying intervals from the starting point within the maximum step sizes.

16. The method of claim 9, wherein the second downhole instrument comprises at least one of: i) an acoustic imager; ii) a resistivity imager; iii) an RF imager; and iv) a nuclear imager.

17. The method of claim wherein each layer consists of one of a plurality of lithological components.

18. A method for evaluating an earth formation intersected by a borehole using standard resolution measurements, the standard resolution measurements having a first resolution resulting from a downhole instrument used to obtain the measurements, the method comprising:
generating an image representative of the formation over an interval of borehole depth, the image having a second resolution greater than the first resolution, by:
identifying layers corresponding to lithotype facies within the interval, the layers defined by boundaries having boundary locations along the borehole;
using a unified characterization of the formation within the interval determined from the standard resolution measurements and the boundary locations within the interval to solve for a value for the formation parameter corresponding to each layer consistent with the unified characterization of the interval.

19. The method of claim 18 wherein solving for the value for the formation parameter corresponding to each layer comprises estimating the most likely volume fraction for each mineral in each layer.

20. The method of claim 18 wherein each layer consists of a bed.

* * * * *